(12) United States Patent
Niczyporuk et al.

(10) Patent No.: US 6,304,684 B1
(45) Date of Patent: *Oct. 16, 2001

(54) INFORMATION PROCESSING SYSTEM AND METHOD OF USING SAME

(75) Inventors: Marek A. Niczyporuk, Palo Alto; Glenn S. Kimball, Modesto, both of CA (US)

(73) Assignee: Cyberecord, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/504,255

(22) Filed: Feb. 15, 2000

(51) Int. Cl.[7] .................................................. G06K 9/00
(52) U.S. Cl. ..................... 382/318; 382/319; 348/110; 348/96
(58) Field of Search ................................. 382/319, 318, 382/312, 286, 124, 123, 112, 164, 171, 173, 275; 358/448, 443; 348/443, 112, 96, 110

(56) References Cited

U.S. PATENT DOCUMENTS

| | | | |
|---|---|---|---|
| 4,346,449 | * 8/1982 | Ovshinsky et al. | 364/900 |
| 4,355,890 | * 10/1982 | Klose et al. | 355/54 |
| 5,748,766 | * 5/1998 | Maase et al. | 382/124 |
| 5,799,098 | * 8/1998 | Ort et al. | 382/125 |
| 5,926,555 | * 6/1999 | Ort et al. | 382/124 |

* cited by examiner

Primary Examiner—Joseph Mancuso
Assistant Examiner—Yosef Kassa
(74) Attorney, Agent, or Firm—William Patrick Waters

(57) ABSTRACT

An information processing system includes an unattended low-resolution wide area pre scanning station and an unattended high-resolution line scanning station. The low-resolution station automatically identifies active image areas and borders on a plurality of light passing documents transported in seriatim along a prescan path. The unattended low-resolution scanning station generates a plurality of active image area signals indicative of the active image areas and borders in a plurality of light passing documents. The unattended high resolution line scanning station includes a high resolution line scanner that responds to the individual ones of said plurality of active image area signals. The high resolution scanning station automatically focuses the high resolution line scanner on only the active image areas of said light passing documents and then converts each scanned document image into a corresponding enhanced digital information signal that is indicative of the image information carried on the scanned document.

27 Claims, 14 Drawing Sheets

REMOVE BACKGROUND NOISE

FIG. 7A ↙ 710
FIG. 7B ↙ 720
FIG. 7C ↙ 730
FIG. 7D ↙ 740
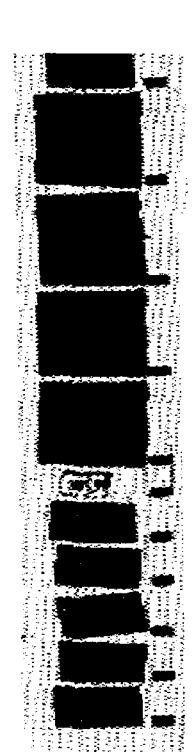
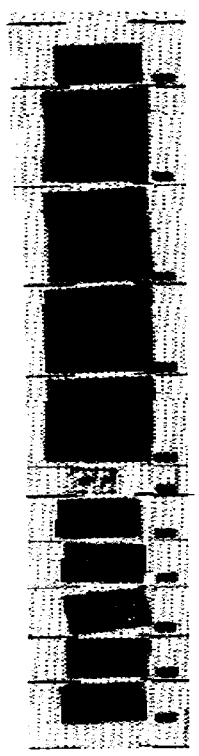
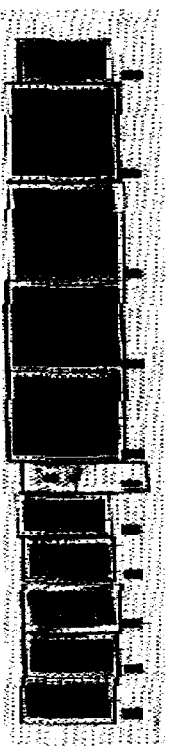
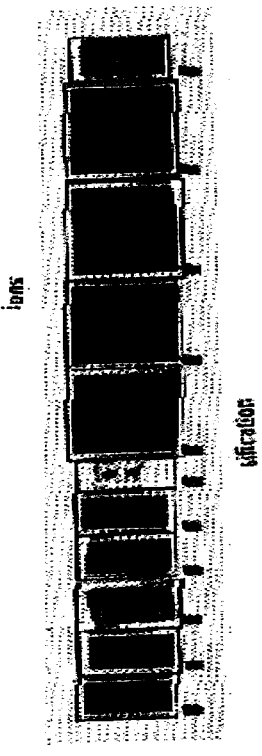

CALIBRATE

AUTO-FOCUS

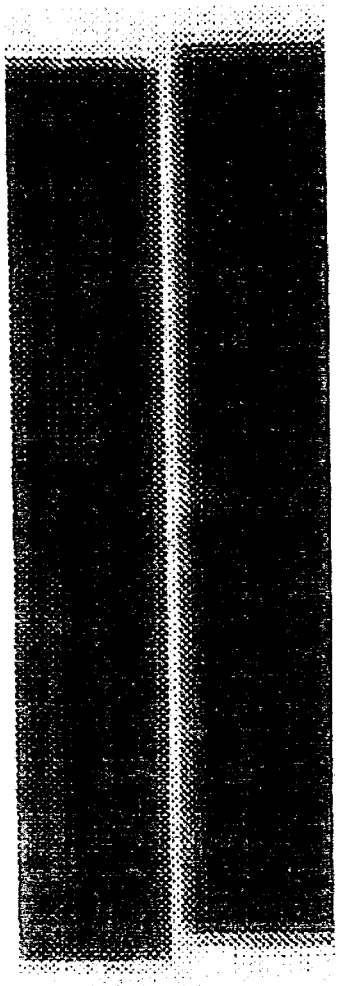
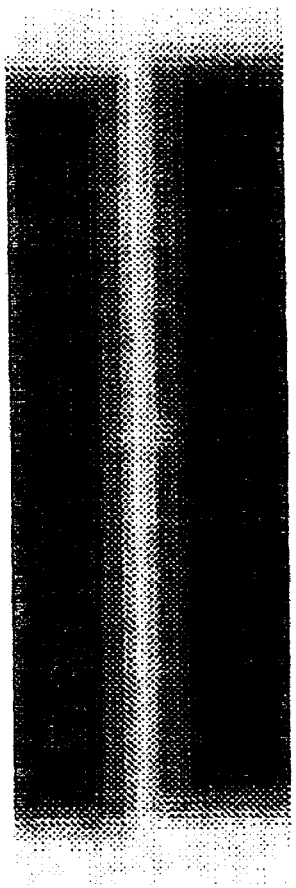
FIG 10 G
FIG. 10 H

INFORMATION PROCESSING SYSTEM AND METHOD OF USING SAME

RELATED APPLICATIONS

This patent application is related to the following concurrently filed copending patent applications: Ser. No. 09/504,256, by Marek A. Niczyporuk, and Glenn S. Kimball entitled "Apparatus and Method of Finding Active Microfiche Image Regions on a Carrier;" and Ser. No.: 09/504,254, by Glenn S. Kimball and Marek A. Niczyporuk, entitled "Apparatus and Method for Processing Microfiche Images." Each of the aforementioned applications is assigned to the same assignee and each is incorporated by reference as though fully set forth herein.

TECHNICAL FIELD

The present invention relates to a method and apparatus for processing document information. More particularly, the invention relates to an image processing method and system for converting light passing media into enhanced digital records.

BACKGROUND ART

For decades, in this and in foreign countries, virtually countless numbers of documents have been stored in media such as microfilm and microfiche. As an example, especially in the case of US census data, hundreds of millions of alphanumeric characters have been stored, in Hollerith code, in punch cards, or aperture cards. In general, these information storage techniques have represented cost-effective and convenient processes for archiving and distributing information.

As a result, storage of information on microfiche became widely popular and utilized by many organizations. Presently, one can find valuable and useful information stored on microfiche, for example, in commercial enterprises, law enforcement organizations and universities. It has been estimated that the number of documents stored on microfiche in the insurance industry alone is counted in the trillions. While the value of information stored on microfiche is recognized, recovering information from storage and rendering it usable by modern image processing systems are frequently arduous, time consuming and labor intensive tasks.

Image scanners are often used for scanning and converting microfiche images into digital format. However, conventional systems for accomplishing these tasks are complex and expensive. In this regard, reference may be made to U.S. Pat. No. 5,845,018 titled "Method and Apparatus for Transferring Multiple Scanned Images from a First Medium to a Second Medium". While the invention therein disclosed has some utility and, indeed, attempts to simplify microfiche to digital document conversion, the apparatus itself is cumbersome and expensive. Further, operation of the apparatus is expensive since as a trained user must be present to observe on a monitor whether expected boundaries of the microfiche images have been properly set to values that do not inhibit accurate boundary detection. Clearly, it is desirable to have a relatively inexpensive information processing system that can be operated efficiently, without requiring skilled employees to supervise system operations.

The situation is complicated further by the nature of typical microfiche media, in which non-uniform images may be cropped, overlapped, skewed or distorted. They may have ragged or unclear borders. In such cases, conventional scanners have difficulty in locating the image to be scanned or in determining the boundaries or edges of the image, especially in cases where the image is skewed. For example, a conventional scanner may interpret a scratch on the microfiche as an image edge or boundary. Of course, such errors limit unattended operation of the scanner and when automatic scanner function fails, operator supervision and control become necessary, with concomitant increases in operating costs.

In view of the foregoing, it is clear that a need exists for an information processing system and method that produces superior digitized images from microfiche documents at high speeds and at substantially lower cost in comparison with conventional systems. Desirably, such a system would itself be low in cost and capable of efficient, effective and unattended operation.

SUMMARY OF THE INVENTION

An unattended information processing system and method includes an unattended low-resolution pre scanning station and unattended high-resolution line scanning station. The low resolution station automatically locates and identifies the active image areas and borders on individual ones of a plurality of light passing documents, generating active image area signals indicative of the location of the identified active image areas. The unattended high resolution line scanning station includes a high resolution line scanner and scanner positioning system that responds to individual ones of the active image area signals by positioning and focusing the high resolution line scanner on only the active image areas of the light passing documents and then capturing and converting each scanned document image into a corresponding enhanced digital information signal that is indicative of the image information carried on the scanned document.

BRIEF DESCRIPTION OF DRAWINGS

The above mentioned features of the invention and the manner of attaining them will become apparent, and the invention itself will be best understood by reference to the following description of the embodiments of the invention in conjunction with the accompanying drawings wherein:

FIGS. 7A–D provide an illustrated example of the consecutive step of detecting image regions within a single row resulting in a set of final regions after fit and classification in accordance with the method of the present invention;

FIGS. 10A–H illustrates various microfiche configurations, orientations, and patterns;

DESCRIPTION OF THE PREFERRED EMBODIMENTS(S)

Figure 1:
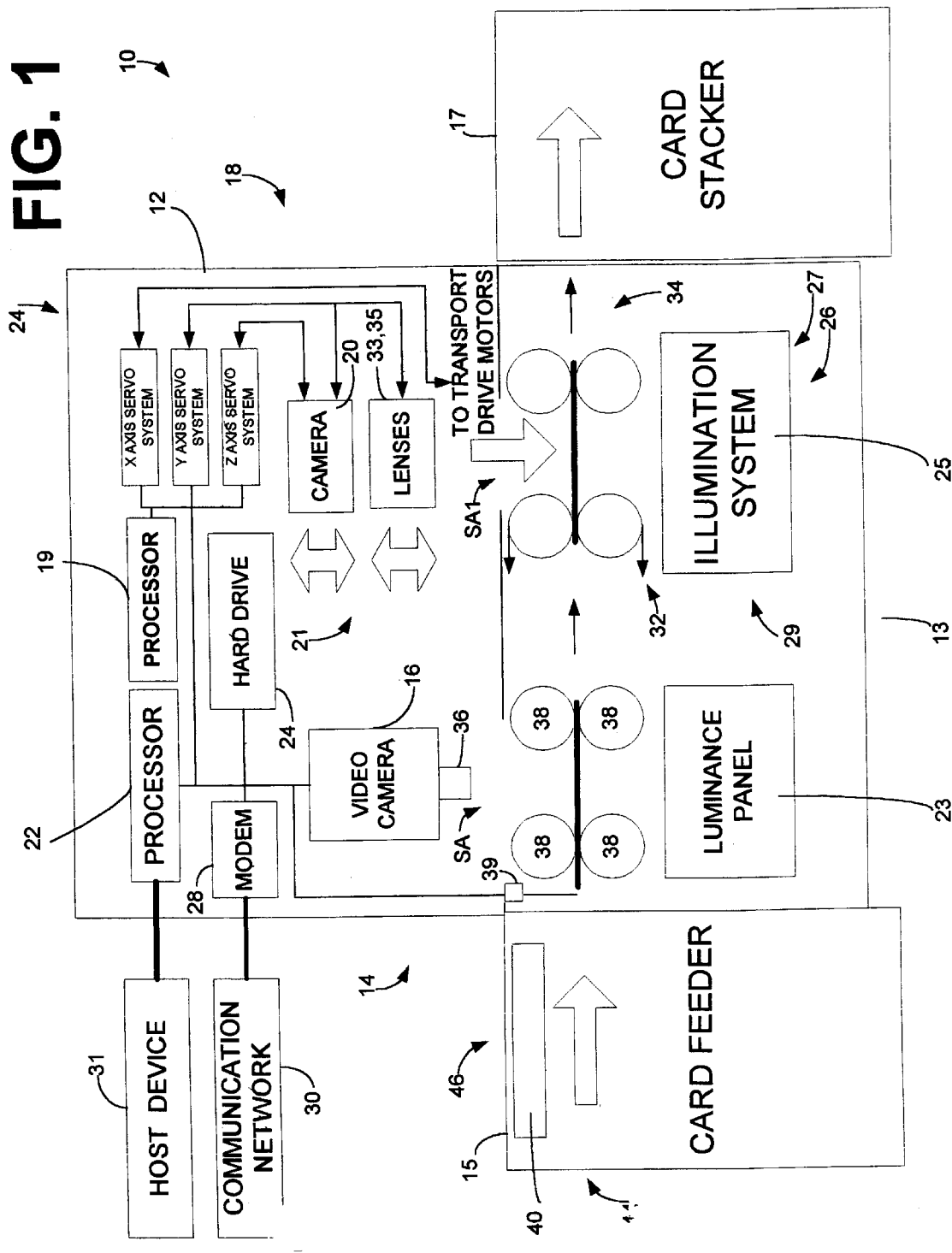
FIG. 1 is a block diagram of an information processing system that is constructed in accordance with the present invention.

Referring now to the drawings and more particularly to FIG. 1 thereof, there is shown an information or image processing system 10, which is constructed in accordance with the present invention. The information processing system 10 converts light passing media, such as paper and microfilm records, into enhanced digital information to enable knowledge workers and consumers to share the converted records electronically over the internet and within company intranet connection. More particularly, the information processing system 10 enables punched cards and microfiche image documents to be converted into enhanced digital documents without substantially altering the appearance of complex graph and picture objects, without distorting fine image features and graphic shapes, and with all or substantially all, background artifacts present in original documents removed from textual images to provide crisp, sharp, black-and-white cyber documents. In short then, the information processing system 10, through a unique combination of image scanning and processing techniques, produces graphic and photographic images that are substantially restored to their original image contrast, sharpness and content even in the presence of cuts, scratches and lines in the original documents.

This disclosure will make reference to microfiche for the purpose of describing the information processing system 10. There is no intention however of limiting the scope of the present invention to microfiche only. Further, where the term "light passing media" or "microfiche" is used, it includes, but is not limited to, cut roll-film, jacketed fiche, aperture cards, punched cards, mounted cut media, microfiche cards and other types of documents or media capable of producing textual, graphic or photographic images when illuminated by a light source.

Considering now the information processing system 10 in greater detail with reference to FIG. 1, the information processing system 10 generally comprises a workstation housing 12 for supporting, in a stationary manner, a prescan station or an image analysis station 14 having a low resolution incremental area prescan or television camera, such as a video camera 16 and a media or document information conversion station 18 having a high resolution specific area or line scan camera, such as a charge coupled device (CCD) camera 20. The prescan station 14 and the conversion station 18 cooperate to provide unattended processing of large sequences of light passing documents. In this regard, the information processing system 10 utilizes a principal area prescan concept to identify active image regions in microfiche to facilitate the unattended processing of large sequences of microfiche. The prescan station 14 detects image regions and image borders in a variety of image formats in order to limit the high resolution scanning operations of the document conversion station 18 to only those active areas identified during prescan operations of the information processing system 10. More particularly, the prescan station 14, as will be explained hereinafter in greater detail, is able to identity accurately the active image areas of a light passing document regardless of image size, image format, image shapes, and image patterns. In short, the prescan station 14 can process both standard and non-standard image documents in large sequences of both a uniform nature and non-uniform nature, without any substantial operator involvement.

In order to facilitate the transport of the light passing media between the prescan station 14 and the document conversion station 18, the image processing system 10 includes a media transport unit 13 that is sandwiched between a media or document feeder 15 and a media or document stacker 17. The document feeder 15, as will be explained hereinafter in greater detail, receives in a stacked manner a large number of light passing media, such as jacketed microfiche cards and Hollerith cards, which are fed seriatim to the transport unit 13 to facilitate the scanning of the document information disposed on each card. After the document information on a given card has been converted to digital information, the transport unit 13 delivers the processed card seriatim to the document stacker 17 to cause the card to be neatly stacked for subsequent removal from the image processing system 10.

Considering now the prescan station 14 in greater detail with reference to FIG. 1, the automatic and robust identification of active image areas, hereinafter called "region finding," is critical to unattended operation. That is, in order to facilitate unattended operation of the system 10, the prescan station 14 must automatically detect the originally recorded image areas.

Those skilled in the art will recognize that microfiche and microfilm images have been captured over the years in various image sizes, formats, and region/border shapes and patterns, many of them non uniform and non standard in nature. The industry, however, has adopted a standard microfiche aperture card, such as cards 11A–11F as illustrated in FIGS. 10A–F. As the cards 11A–11F have standard dimensions, only card 11A will be described.

Figure 10A:
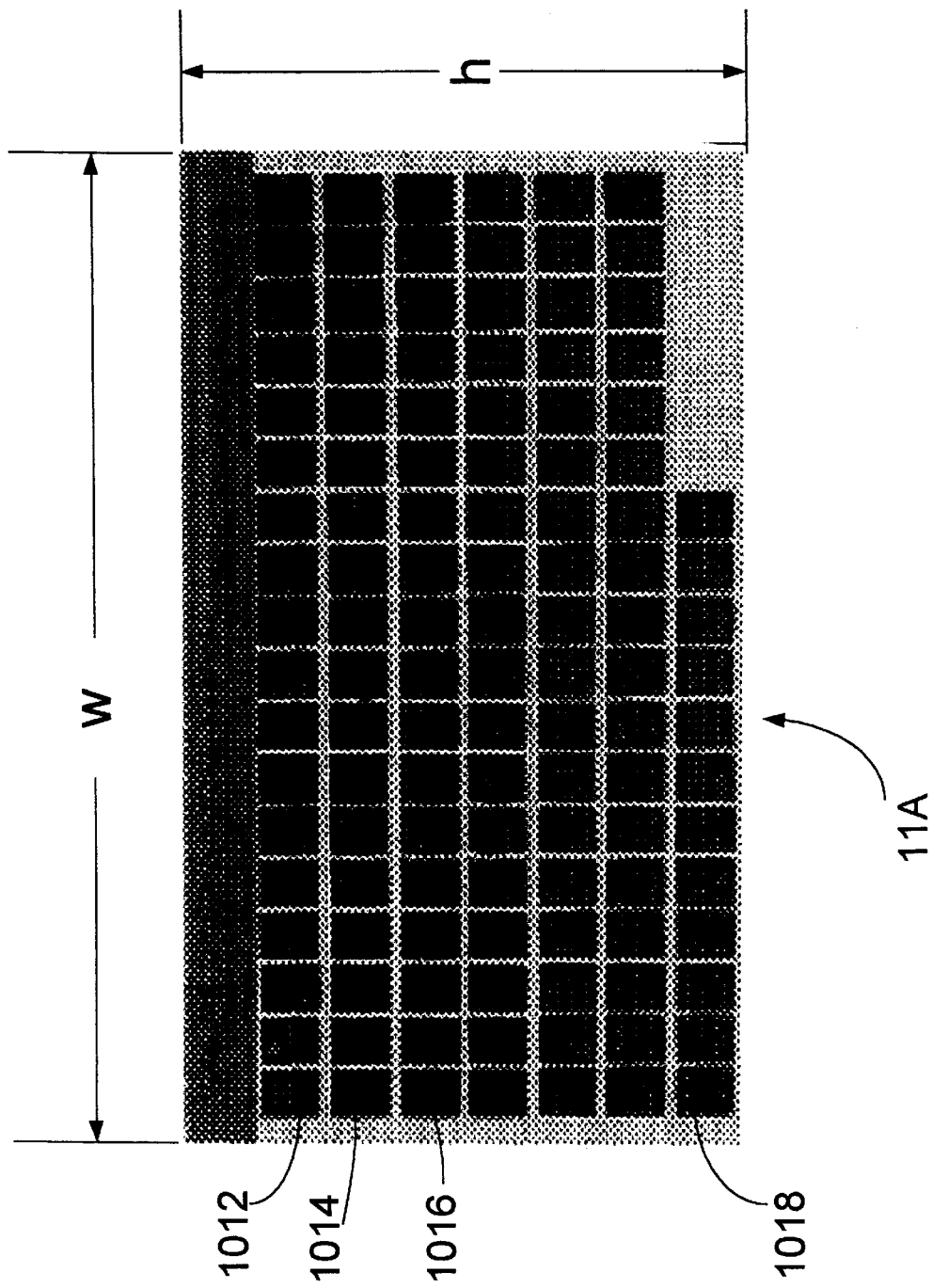

As best seen in FIG. 10A, the card 11A is approximately 4 inches in height and 6 inches in length and includes a block of apertures arranged in series of equally spaced rows and columns. The apertures are configured to permit various microfiche to be overlaid so that they may be illuminated by a source of light either from above or below the card 11A. FIGS. 10A–F provide exemplary samples of the different types of microfiche formats, sizes and patterns that may be encountered on a standard card, such as the card 11A. Table I summarize the samples found in FIGS. 10A–F.

TABLE I

Figure 10B:
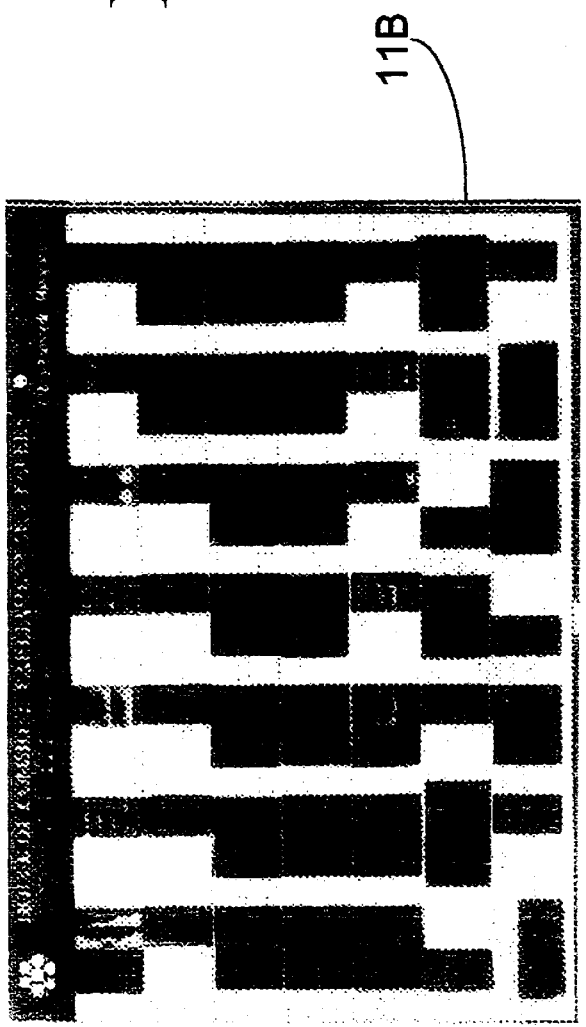
Figure 10C:
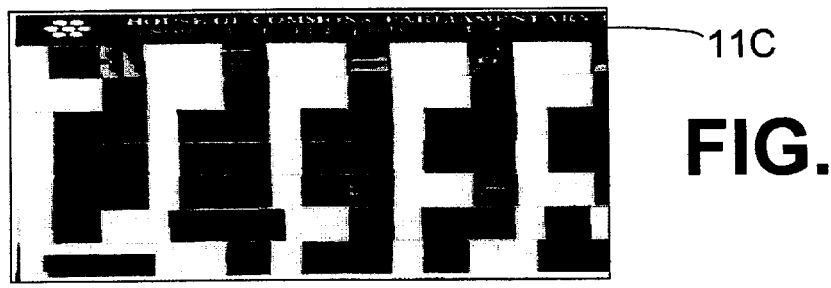
Figure 10D:
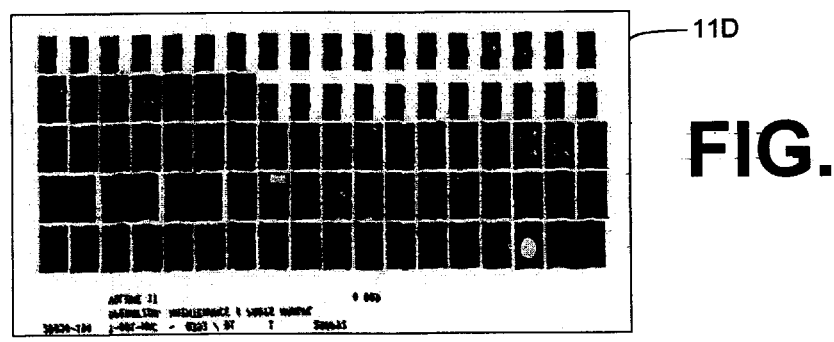
Figure 10E:
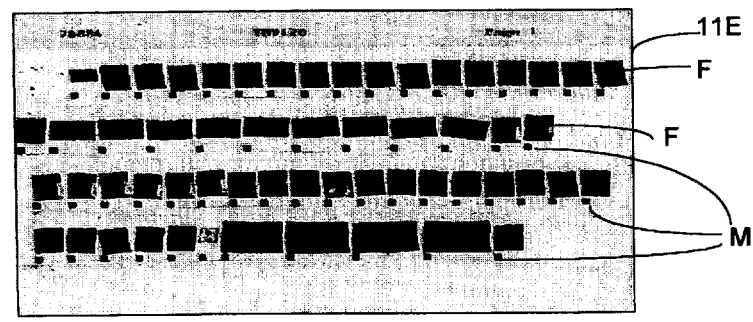
Figure 10F:
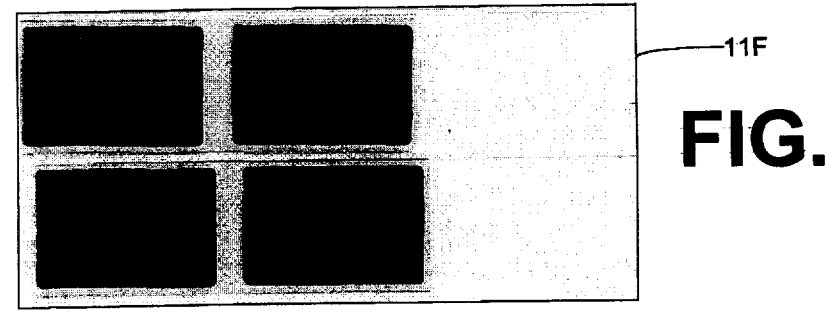

| Format | Contrast | Brightness | Size | Orient. | Layout |
| --- | --- | --- | --- | --- | --- |
| Uniform | FIG. 10A | FIG. 10A | FIG. 10A | FIG. 10A | FIG. 10A |
| Non Uniform | FIG. 10B | FIG. 10C | FIG. 10F | FIG. 10E | FIG. 10D |

In order to detect and scan successfully such a large variety of image forms, patterns and borders, the system 10 includes an image processor or prescan controller 22 that cooperates with the low resolution camera 16 to detect automatically active image regions and borders in a variety of image formats. In this regard, the low-resolution camera 16 quickly previews at low resolution the entire face of the media so that image positions may be determined (or aperture card holes mapped). The camera 16 views a sufficiently large area to capture a slice of the microfiche as it passes by the camera 16. In this regard, the camera 16 is able to capture an area approximately 1 inch wide 4.1 inch high, which height corresponds to the height of microfiche. As the media passes by the camera 16, the microfiche is illuminated from behind by a shallow-depth electroluminescent panel 23 that uniformly illuminates each microfiche passing through the prescan station 14. In this regard, the panel 23, unlike conventional light boxes, has substantially no depth, generates little heat and only a low luminance level that is sufficient for the low resolution video camera 16 to capture those microfiche images passing by the camera 16.

When the panel 23 illuminates the microfiche aperture card, the camera 16 detects the illuminated microfiche capturing the entire card, top to bottom and end to end in several sequential exposures. The exposures overlap horizontally and are stitched together by the processor 22 utilizing a set of image processing mathematical fitting and optimization algorithms and statistical modeling methods (hereinafter referred to collectively and separately as a region finding algorithm) to robustly identify image borders in standard and difficult, old, noisy microfiche formats, More particularly, the prescan processor 22, under control of a region finding algorithm 100, accomplishes the following functions in a fast and efficient manner, without operator intervention:

1. detection of fiche regions of varying sizes and skew orientations;
2. detection of overlapping fiche regions;
3. detection of fiche regions with weak, fuzzy, unclear borders; and
4. robust detection of fiche image regions and borders for low-quality and noisy images, with non-uniform regions and border patterns.

In summary then, in a single pass by the low resolution camera 16, the processor 22, in cooperation with the region finding algorithm 100, identifies and establishes all image positions and their associated boundaries for sequence use and processing by the high-resolution image information conversion station 18.

Although in the preferred embodiment of the present invention the camera 16 is described as a low-resolution camera, it is contemplated that a single high resolution camera may be employed utilizing its low resolution setting if applicable, to capture active microfiche image areas.

Since video camera lens distortion varies from camera to camera, a calibration algorithm 150 (FIG. 9) is performed each time the image processing system 10 is equipped with a low-resolution camera that has not been calibrated. In this manner, the calibration is accomplished in the factory at time of system assembly or in the field at time of installation by a trained technician. The calibration algorithm 150 will be described hereinafter in greater detail. It will suffice at present to indicate this calibration process is to correct lens distortion of the camera 16. Thus, once the replacement of camera 16 is calibrated, the calibration process need not be performed again unless replacement of the camera 16 is required.

As will be explained hereinafter in greater detail, the detection processes of the present invention are unique and novel since they utilize neither fixed grid or leading/trailing edge detection techniques. It is known that such techniques are insufficient for unattended processing and digitizing of large volumes of microfiche image archives of varying formats and quality. In short, the region finding algorithm 100 of the present invention is able to process prescan document data at a very fast rate of less than one second per document with optimization and slightly more than two seconds per document in worst case situations for image locating purposes.

In operation, the information processing system 10 functions in accordance with two primary operational systems: one category of firmware and software is dedicated to those operational systems for mechanical, system and network control and the other category of firmware and software is dedicated to operational systems for image processing control.

OPERATIONAL SYSTEMS

Considering now the control, system and networking firmware and software operational systems in greater detail, these operational systems interface and control various ones of the hardware components found within the information processing system 10. Such hardware components include:

1. a conventional operating system platform such as an Intel Pentium III platform, using a conventional operating system such as Windows NT;
2. a control panel interface: user interface buttons, switches, light emitting diode display and liquid crystal display for display of information characters;
3. a networking interface to host (destination) system, where scanned and digitized images are deposited;
4. a low-resolution (area-scan) camera frame capture, with flat-panel illumination;
5. a high-resolution (line-scan) camera frame capture, with camera mover, optics and illumination control;
6. a microfiche/aperture card transport mechanism and control; and
7. a high-resolution (line-scan) camera mover, optics, and illumination control.

To the extent that mechanical, system and network controls present unique operational characteristics within the information processing system 10, such controls will be described in greater detail.

Figure 9:
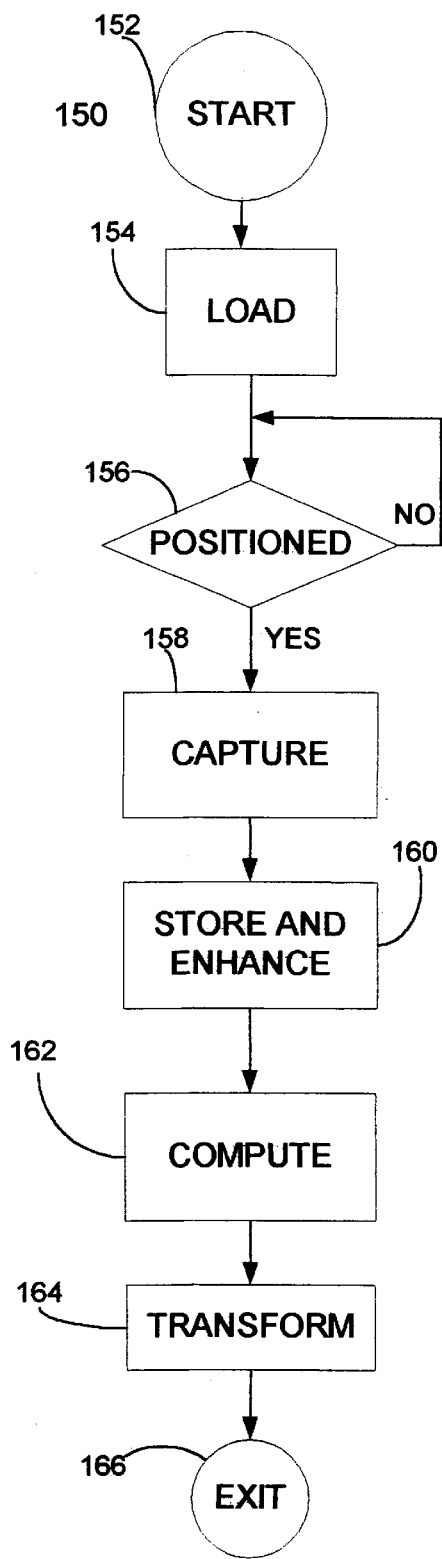
FIG. 9 is a flowchart illustrating a set of steps performed to calibrate the low-resolution camera of FIG. 1.

Considering now the calibration algorithm 150 in greater detail with reference to FIG. 9, the calibration algorithm 150 is performed either in the factory or in the field prior to actual large volume card processing. As mentioned earlier, the calibration algorithm 150 is performed to compensate for lens distortion geometry associated with the video camera 16. In this regard, in order to facilitate the calibration, a calibration card (not shown) having a grid array of precisely aligned horizontal and vertical lines is loaded into the media or card feeder 15 by a factory technician or field installer. After loading the calibration card into the card feeder 15, the user actuates a calibration switch (not shown) mounted to the housing 12. Upon detecting the activation of the calibration switch, the calibration algorithm 150 advances from a start command 152 to a load command 154 which causes the calibration card to be transported from the document card feeder 15 into the prescan station 14. After executing the load command 154, the system proceeds to a determination step 156 to verify that the calibration card has been properly positioned within the prescan station 14 for image capture purposes. In this regard, the system will loop at the determination step 156 until the calibration card has been advanced to a proper position by the transport 13.

Once the calibration card has been positioned within the prescan station 14, the program advances from the determination step 156 to a capture command 158 that causes the low resolution video camera 16 to capture an image of the calibration grid in the field of view of the low resolution camera 16.

Next, the calibration algorithm proceeds to a store and enhance command 160 that causes the image viewed by the low resolution camera 16 to be stored for image enhancement and analysis purposes. The system then goes to a compute command 162 that causes the image data indicative of the grid coordinates to be retrieved and analyzed by computing non-linear distortion from the grid coordinate information. Once the non-linear distortion has been determined, the system proceeds to a transformation command 164 that derives a transformation to be utilized on each prescan image slice captured by the low resolution or prescan camera 16. The application of the transformation to subsequent images is called "dewarping" and corrects for lens distortions associated with the camera 16.

Once the dewarping transformation has been determined and stored, the system advances to an exit command 166. It should be noted in FIG. 3 at an application command 309, the dewarping transform is applied to each image slice captured by the prescan camera 16.

The processes for computing non-linear distortion using a fixed grid coordinate basis (command step 162) and deriving a dewarping transformation therefrom (command step 164) are well known to those skilled in the art. Accordingly, the sub-steps associated with commands 162 and 164 will not be described hereinafter in greater detail.

The image processing control firmware and software will now be considered in greater detail. Such image processing, occurring within the information processing system 10, is unique and results in a system that is able to process large volumes or sequences of microfiche images without any substantial operator intervention. For the purpose of simplifying the description of the component operations of the image processing system, the functional aspects of the various ones of the systems will be described individually and classified for the discussion as follows:

I. prescan image analysis and region finding;

II. image enhancement; and

III. supplemental image processing tasks.

It should be understood by those skilled in the art such classification is useful as an aid for better understanding of the unique nature of the information processing system 10, and is not intended to limit the scope of the present invention.

I. PRESCAN IMAGE ANALYSIS AND REGION-FINDING

Considering now the image processing system 10 in greater detail with reference to FIG. 1, the image processing system 10 includes a unique set of image processing algorithms that, in combination, permits large sequences of microfiche images to be processed and converted into enhanced digital images without any substantial operator intervention. More particularly, as will be explained hereinafter in greater detail, the image or region finding algorithm 100 is executed in two major steps: first the algorithm finds uniform horizontal rows, and second the algorithm finds non-uniform image regions within each row.

1. Finding uniform horizontal rows

The region finding algorithm 100 includes a set of algorithm components that fits a uniform horizontal line array to the prescan image data. In this regard, the algorithm 100 functions to define a "Quality-of-fit" (Q-fit) variable for fitting uniform horizontal row patterns. Q-fit is maximized for an optimal pattern of horizontal rows, defined by number of rows (nRows), starting at y-coordinate of a first row (yRowStart) indicated generally at 1012 (FIG. 10A), and a vertical y-height for each subsequent row (yRowStep). Thus, for example, as best illustrated in FIG. 10A, subsequent rows proceed as (yRowStart+1*yRowStep) indicated at 1014, (yRowStart+2*yRowStep) indicated at 1016 and so forth, ending with (yRowStart+nRows*yRowStep) indicated at 1018.

The region-finding algorithm 100 employs a linear combination of two types of quality-of-fit variable for fitting optimal pattern of horizontal rows: linear quality-of-fit (Q-FitLin) and fuzzy quality-of-fit (Q-Fit-Fuzzy) variables, described below. The region finding algorithm 100 functions to provide the linear quality-of-fit variable (Q-FitLin) that is defined using the following image intensity-based components:

A. Polarity*(IAveLin [n, n+1]–IAveMid [n]: signed positive or negative (Polarity=+1 or –1) difference between an average intensity along row border line (IAveLin) and an average intensity of mid-image region between row border (IAveMid) for a current row (n). The sign (Polarity) determines if horizontal row borders are expected brighter or darker from the active mid-image regions. This term maximizes differences between intensity along borderlines versus mid-image intensity between borderlines.

B. –abs(IaveLin[n]–IAveLin[n+1]: negative absolute difference between an average intensity along a row border (IAveLin) between consecutive rows (n, n+1). This term minimizes differences between intensity along consecutive horizontal row borderlines.

C. +(IVarMid [n]–IVarLin [n, n+1]): difference between a variance of horizontal pixel-to-pixel intensity within a mid-image region between row borders (IVarMid) and a variance along row borderlines (IVarLin). This term expects high variance or image information content along active image areas, and expects low variance along horizontal row borderlines.

Such constructed linear quality of fit index (Q-FitLin) is maximized when a fitted line pattern is placed on top of borderline between consecutive rows of image regions. Total quality of fit index is computed for each row, summed and averaged for all rows.

Figure 11:
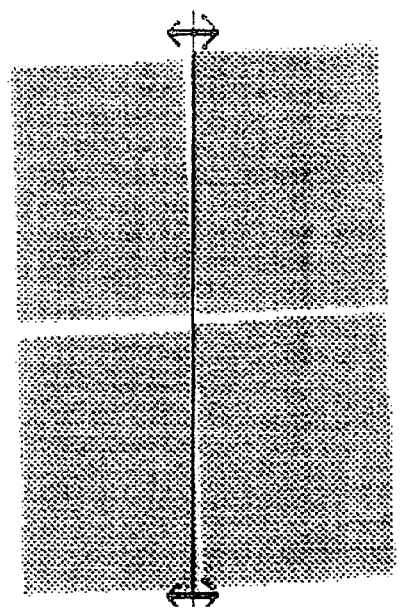
FIG. 11 is a greatly enlarged section of adjacent microfiche images illustrated in FIG. 10B.

The region finding algorithm 100 further functions to provide a fuzzy quality-of-fit variable (Q-FitFuzzy) that is similar to the linear index (Q-FitLin), except that fuzzy-wide lines are utilized instead of simple lines for computing along row-border components (IAveLin, IVarLin). In this regard, if a border between image rows is very narrow, and furthermore, if the image is slightly rotated, the simple line utilized in (Q-FitLin) will not identify the bright (Polarity=+1) border between rows. FIG. 10B illustrates such a difficult case with narrow row-border lines. FIG. 11 is an enlarged view of FIG. 10B to further illustrate where the narrow border and rotation is exaggerated to demonstrate how fitting a simple "narrow" borderline, such as a border 1017 is inadequate.

When computing the Q-FitFuzzy components of average intensity and variance along wide-fuzzy horizontal row-border line (IAveLin, IVarLin), maximum (Polarity=+1) intensity is used in a small vertical neighborhood near the ideal horizontal line, whereas the simple "narrow" line would fail to overlap the very narrow and possibly rotated border between images (see FIG. 11). Thus, Q-FitFuzzy derived along fuzzy-wide lines is maximized when fitting correct set of horizontal lines, whereas linear Q-FitLin would fail to exhibit a maximum for the same optimal set of row-lines.

The region finding algorithm 100 also combines the simple linear quality of fit (Q-FitLin) with the fuzzy-wide quality of fit (Q-FitFuzzy) indices to arrive at a total quality of fit (Q-Fit=Q-FitLin+Q-FitFuzzy). Such combined Q-Fit variable is maximized for the optimal fitted pattern of uniform horizontal line borders, such as illustrated and described relative to FIG. 10A and FIG. 10B:

1.) When Q-Fit operator is computed for fitting positive polarity lines (Polarity=+1: borderlines are expected bright, the operator is designated as Q-FitPos.

2.) When Q-Fit operator is computed for fitting negative polarity lines (polarity=−1: borderlines are expected dark, the operator is designated as Q-FitNeg.

The region-finding algorithm 100 further functions to apply a BLENDED-DILATE morphological filter to expand very narrow borders between rows. In this regard, for positive polarity (Polarity=+1), the algorithm utilizes a BLENDED-MAX-N filter operator dilating (i.e. expanding) bright borders between darker image regions as illustrated for example in FIG. 10G. For negative polarity (Polarity=−1) the algorithm utilizes a BLENDED-MIN-N filter operator, dilating (expanding) darker borders between brighter image rows.

For example, in FIG. 10G a narrow-border image (magnified ×5 times), a MAX-N operator (N=7) replaces each pixel with a maximum of pixels in N×N neighborhood, effectively dilating, or thickening, a very narrow border between images. The image dilated using MAX-N operator is blended (averaged) with the original image, such that a resulting BLENDED-MAX-N image contains both the original (narrow sharp and precise) thinner borders between images regions, and dilated (wider but less precise) thicker borders between image regions, such as in FIGS. 10B and 10G. FIG. 10G illustrates a magnified (×5) image fragment from FIG. 10B with a raw image at the top of the sheet, and a BLENDED-MAX-7 in FIG. 10H at the bottom of the sheet.

In summary then, when optimal horizontal uniform line pattern is fitted, described by [nRows, yRowStart, yRowStep], the algorithm maximizes Q-Fit quality -of-fit applied to BLENDED-MAX-N enhances image (such as shown in FIG. 10H), rather than original image (such as in FIG. 10B). Q-Fit already handles narrow image borders because of the Q-FitFuzzy component with its wide-fuzzy line fit, and use of BLENDED-DILATE filter (BLENDED-MAX-N or BLENDED-MIN-N) further enhances robustness of Q-Fit fit.

Now that the algorithm components for fitting uniform horizontal image rows are outlined and described, the complete algorithm for detecting and fitting uniform image rows is summarized as follows:

1.) Assume positive polarity (border lines are bright):
   a). Enhance the prescan image using the BLENDED-MAX-N operator;
   b). Fit an optimal pattern of horizontal row, defined by number of rows, starting y-coordinate of first row, and vertical y-height for each row (nRows, yRowStart, yRowStep), by maximizing the Q-FitPos variable fitted to image enhanced with BLENDED-MAX-N operator.

2.) Assume negative polarity (border lines are dark):
   a). Enhance the prescan image using a BLENDED-MIN-N operator;
   b). Fit an optimal pattern of horizontal rows, defined by number of rows, starting y-coordinate of first row, and vertical y-height for each row (nRows, yRowStart, yRowStep), by maximizing Q-FitNeg variable fitted to image enhanced with BLENDED-MIN-N operator.

3.) Select an optimal positive (Q-FitPos) or negative (Q-FitNeg) polarity pattern, whichever is greater, i.e. yielding better fit. In order to assume symmetrical comparison between positive and negative quality-of-fit variables, they may be calculated using identical number of image rows, such that comparison of Q-FitPos and Q-FitNeg is not biased by the different number of detected rows in the positive-vs-negative comparison. The resulting pattern of horizontal rows, defined by number of rows, starting y-coordinate of first row, and vertical y-height for each row (nRows, yRowStrart, yRowStep), identifies uniform active image rows.

2. Find Non Uniform Regions Within Each Row

Once that the optimal image rows are identified as described in the previous section, the image region finding algorithm 100 proceeds to search and detach individual non-uniform image regions within each row. The following will describe the algorithm components utilized for detecting regions in a single row of a prescan image. It should be understood however, by those skilled in the art that the described process would be carried out for each row that is identified. Accordingly, there is no intention of limiting the present invention to finding images in only a single row as the process is repeated for each identified row.

Considering now the algorithm components for finding non-uniform regions within an identified row relative to the image finding algorithm 100:

a. Quality-of-Fit (Q-Reg)

The first componetn is to define the Quality-of-fit (Q-Reg) variable for fitting rectangular regions to image data within each row. Unlike global Q-fit (maximized when a global pattern of uniform rows is fitted to an image). Q-Reg is determined separately for each region within each row. That is for any given region, Q-Reg is maximized when a region shape matches image data. In this regard, a region shape is defined by rectangular coordinates (x-Min, y-Min, x-Max, and y-Max). An array of fitted regions may be of different widths and heights, and thus the image region finding algorithm 100 references the regions by row number, counted from the image top and region number within each row, counted from image left edge.

A matrix of regions, consists of region coordinates and quality of fit defined as follows:

$$\text{x-Min}[i,j],\ \text{y-Min}[ij],\ \text{x-Max}[i,j],\ \text{y-Max}[i,j],\ \text{Q-Reg}[i,j]$$

where:

x-Min, y-Min, x-Max, y-Max=represent the rectangular coordinates for the current region.

Q-Reg=represents the quality-of-fit for the current region.

i=1 . . . n Rows: represents the row number.

j=1 . . . n Regions [i]: represents the region's (column) number, up to the number of regions in each row.

n Rows=represents the number of rows n Regions [i]=represents the number of regions for the i-th row.

Considering now the Quality-of-fit variable (Q-Reg) in still greater detail, the Q-Reg variable is defined as a linear combination of the following image intensity-based components:

1.) Polarity*(IAveLin−IAveMid)

Signed difference between average intensity along a region's edge lines (IAveLin) and a region's interior (IAveMid). The sign (Polarity) determines if the region's borders are expected brighter or darker from the active mid-image regions. This term maximized the difference between intensity along the region's borderlines versus the mid-image intensity.

2.) −abs(IAveLinI−IAveLin2)

Negative absolute is the difference between the average intensity between two region's edge lines, either in the horizontal or vertical. This term maximizes uniformity of image intensity along borderlines.

3.) +(IVarMid−IVarLin)

The difference between variance of horizontal pixel-to-pixel intensity within a mid-region inside of its borders (IVarMid) minus variance computed along the region's border lines (IVarLin). The term expects high variance or image information content along active image areas, and expects lower variance along horizontal row borderlines.

The quality-of-fit variable Q-Reg is calculated using four borderlines tracing each local rectangular region (2-dimensional equation). In this regard, it contains horizontal (Q-RegX) and vertical (Q-RegY) components, each using two of a region's border lines and its mid-interior.

It should be noted that although the components of Q-Reg appear similar to the components of Q-Fit, there are important differences that are summarized as follows:

1.) Q-Fit is determined globally for a uniform pattern of horizontal rows, whereas Q-Reg is determined separately for each region, and allows for non-uniformity of consecutive region shapes.

2.) Q-Reg is determined using four borderlines tracing each local rectangular region (a 2dimensional equation), whereas Q-Fit fits long global horizontal borders between rows (a 1-dimensional equation).

3.) Consecutive Q-Reg non-uniform regions may contain non-uniform black space between neighboring region, whereas uniform Q-Fit fits global row uniform patterns.

4.) BLEND-DILATE or BLEND-ERODE operations used in fitting Q-Fit are not needed to fit Q-Reg, instead Q-Reg utilizes the raw image to assure accurate fit to each row's region.

5.) Image Polarity in Q-Reg is determined separately for each row, whereas Q-Fit utilizes a global polarity setting to fit global uniform row patterns.

b. Accumulated Quality of Fit Statistics

Considering the Quality-of-Fit variable Q-Reg in still greater detail, the image region finding algorithm 100 accumulates the Quality-of-fit statistics of Q-Reg values and associated components. In this regard, the algorithm 100 executes the following functions:

1.) Statistics for all regions in a single row are determined:
Average, standard deviation, and range of Q-Reg for all regions in each row are determined, and
Average, standard deviation, and range of each region's geometry, such as region size and separation between regions, along both horizontal and vertical axis.

2.) Similar global statistics for all regions in all rows is determined.

It should be noted that the algorithm 100 assumes that consecutive image rows may contain varying region formats and sizes, and even opposite polarities. Therefore, mostly local Q-Reg statistics accumulated for each row are utilized in classification or 2-dimensional regions, or polarity detection.

The algorithm 100 recognizes that for a large majority of fiche formats, shapes and polarity of regions are similar. In such cases, all the foregoing described region detection, classification and statistical analysis equations may utilize global Q-Reg statistics, accumulated for all regions in all rows, rather than Q-Reg statistics for a current row only.

Finally, it should be noted that if such global uniformity is known ahead of actual analysis, a user could select a "global region format" option to take advantage of such between rows uniformity, to use global Q-Reg statistics. This option does not assume identical column sizes or spacing, only the same polarity between rows, and "similar" sizes and spacing. Otherwise "row-only region format" allows for very diverging format and polarity between rows.

c. Detection of Polarity of Region's Rows

Image Polarity is determined separately for each row, in (unlikely but possible) case of different polarity between consecutive rows. In most cases, the polarity of each row is the same as the global polarity determined from fitting uniform row patterns (Q-Fit). Also in most situations, higher average Q-Reg statistic (for all detected regions within a given row) corresponds to correct polarity. However, since the number of regions and region size are variable, there is a lack of symmetrical comparison such as Q-Fit with a fixed number of rows (nRows). Furthermore, it is possible that consecutive image rows will have different polarities, for example when jacketed 1.6 mm film is inserted, with first row positive and second row negative.

For added accuracy, the algorithm 100 utilizes multivariate logistic regression to accurately detect the polarity for each row. The dependent variable (outcome) of logistic regression is Polarity, with two possible outcomes.

An independent variable set is utilized, as input to assess Polarity comprised of the difference between statistics of optimal positive minus optimal negative fit for a current row (Q-RegPos−Q-RegNeg).

Average, standard deviation, and range of Q-Reg for all regions in each row are utilized, as well as individual linear components of Q-Reg quality-of-fit, together with average, standard deviation, and range of the geometry of the region, such as region size and separation of regions, along both horizontal and vertical axis.

Logistic regression results in a probability p-value: p=0 indicates positive polarity, p=1 indicates negative polarity, and p near 0.5 indicates ambiguity. For any row of regions, if logistic regression yields ambiguous assessment of polarity for a current row, the algorithm 100 utilizes the same regression model applied to global Q-Reg statistics to determine and use the global polarity setting. Furthermore, if a "global region format" option is enabled as previously discussed, the global polarity is determined by inputting global-scope rather than row-scope Q-Reg statistics.

Now that the components of the image region finding algorithm 100 relative to finding non-uniform image regions has been discussed, it may be beneficial to briefly review the algorithm 100 in overview. In this regard, image regions are detected and classified for each image row, detected as described above.

a. Assume Uniform Row Pattern. The algorithm 100 assumes that a uniform row pattern was already detected from fitting optimal row geometry with maximizes Q-Fit statistic. For each row, the algorithm fit non-uniform image regions.

b. Fit Simple Regions to Current Row Data. Simple regions are defined with uniform height (yRowStep), and no separation between regions (xMax[n]=xMin[n+1]).

FIGS. 7A–D and 8A–D are examples illustrating the consecutive steps of search and detection of simple regions within a single row, that are summarized as follows:

Assume that uniform simple region's height matches row's height (yMax–yMin=yRowStep), thus, only horizontal quality-of-fit component (Q-RegX) is utilized. Further assume that such simple regions have no separation between them (xMax[n]=xMin[n+1]).

Fit first optimal simple region that maximizes Q-RegX. In this regard, the region's geometry is unknown, and the program initially assumes uniform region heights (yRowStep) for the entire row. The first region detected in a current row provides initial estimate rather than precise region's shape. If such a first region is excessively large, it could contain multiple actual regions—that is acceptable since the algorithm 100 will subsequently classify such cases.

Continue adding additional simple regions: Subdivide existing simple regions, or add additional simple region between image edge and first or last existing simple region, to maximize quality-of-fit (QRegX) of new added region. It should be noted that QRegX for the newly added region is maximized, rather than an overall average quality-of-fit for all regions within the current row, since overall quality may decline when the new added region is of a lower quality, but is still valid.

Figures 8A, 8B, 8C, 8D:
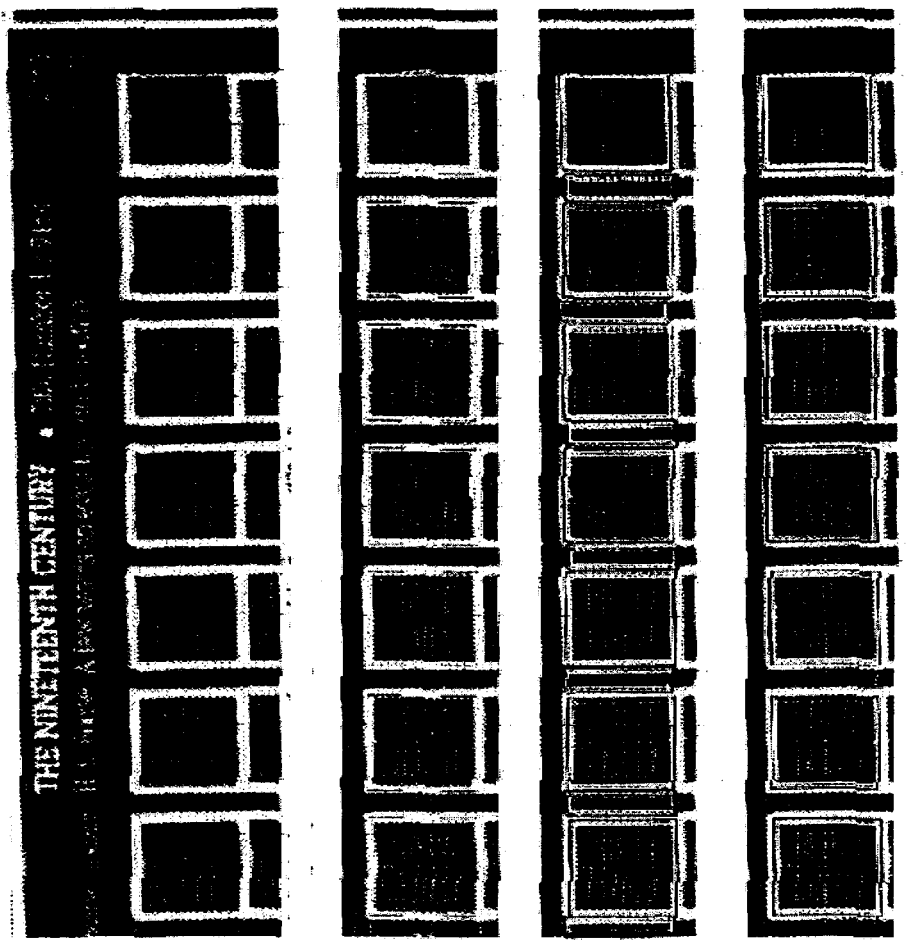
FIGS. 8A–D provide another illustrated example of the consecutive step of detecting image regions within a single row resulting in a set of final regions after fit and classification in accordance with the method of the present invention.

Iterate adding simple regions (uniform height, no in-between spacing), until either best quality of added region QRegX is below a minimum threshold, or there is no more room to add a new simple region. As a practical limit, the simple region's minimum size is one third of the estimated (xEstSize=yRowStep). The threshold of QRegX is biased to accept simple region later classified as invalid, rather than to reject a valid region. FIGS. 7B and 8B illustrate initial detection of simple regions.

c. Convert Simple Regions to 2-Dimensional Regions. Convert simple regions (of uniform height equal to row height, and without spacing between consecutive regions) to 2-dimensional regions. Optimal region size (xMin, yMin, xMax, yMax) is fitted to maximize quality of fit for each region separately (Q-Reg), which is a linear combination of horizontal QRegX and vertical QRegY components). Region's x-size is reduced to maximize QRegX quality-of-fit, thus, introducing spacing between consecutive regions. Region's y-size is reduced to better fit image data, maximizing QRegY quality-of-fit. FIGS. 7C and 8C provide illustrative examples of search and detection of simple regions converted to 2-dimensional region boundaries.

d. Fit and Classify 2-Dimensional Regions. FIGS. 7D and 8D are illustrative examples of a final fit and classification of active image regions. Consecutive 2-dimensional regions within each row are re-fitted and re-classified according to the following criteria:

Classify False Border Regions: Depending on the size of the image borders, sometimes first or last detected region in a given row is an artifact of artificial edge rather than active image area. A statistical model detects such conditions and invalidates such false border regions, as illustrated in FIG. 7C, which shows such borders at its left edge. The short separators between active images (FIG. 7C) is another type of border region resulting from a mask pattern utilized when the microfilm was filmed.

Q-Reg statistics are sufficient to accurately classify such false border regions. Contributing factors are:

1). Statistically significant lower information content (pixel-to-pixel intensity variance) of such border region, compared to row's average, or compared to its neighboring regions;

2). High intensity contrast component QRegX (indicating weak or no top or bottom region edges—see FIG. 7), but significantly lower contrast in component of vertical QRegY fit (indicating weak or no top or bottom region edges); or 3). Shorter x-size (xMax–xMin) compared to its neighboring regions or compared to row's average region's x-size.

Classify Very Large Regions. Large regions are defined when x-size is much larger than average x-size of the remaining images with the current row, or much larger than estimated regions dimension (xEstSize=yRowStep). Large regions may be acceptable, but the algorithm 100 will attempt to subdivide them, with relaxed (QReg) quality-of-fit criterion.

Classify Very Small Regions. Small regions that are classified as false border regions are deleted as best seen in FIGS. 8A–D (see 810, 820, 830, and 840 respectively). Otherwise, very small regions are either merged with their most likely neighbor, or deleted depending on the resulting quality-of-fit Q-Reg. and depending on separation of the region to its nearest neighbors.

Classify Empty Space Near First or Last Image. The algorithm recognizes that sometimes-empty space is actually a title or index page, with much reduced information content. Thus, such empty space near a first or last image in a current row is fitted to a potential region, with a relaxed (Q-Reg) quality-of-fit criterion.

Normalize and Refit Optimal Region Sizes. The algorithm finds the optimal region size (xMin, yMin, xMax, yMax) and fits it to maximize quality of fit for each region separately (Q-Reg, which is a linear combination of horizontal Q-RegX and vertical Q-RegY components), The x-size of the region is reduced to maximize Q-RegX quality-of-fit, thus introducing spacing between consecutive regions. The y-size of the region is reduced to better fit image data, maximizing Q-RegY quality-of-fit.

It should be noted that to assure some degree of uniformity, the y-size of the region is not reduced beyond average yMin and average yMax of all regions in a current row, as illustrated in case of the narrowest (sixth) region at the bottom of FIG. 7D.

e. Detect and Classify Regions Using Image Marks. Image marks or "blips" are illustrated in FIGS. 7A–D. Such marks are detected by convoluting consecutive horizontal image slices with a rectangular shape corresponding to the shape of the mark. In this regard, if such marks are detected for a current row, and distribution of marks is statistically similar, that is nearly overlapping, to the distribution of regions detected without assistance of such marks, then image marks are utilized to assist in optimizing the active image regions:

Simple regions are fitted all at once; with x-positions corresponding to detected marks, rather than added one at a time.

Y-coordinate of mark's row is used to automatically cut-off these marks from active image regions, as illustrated for example in FIGS. 7A–D.

Classification of the regions (cases of border, large, small, split/merge regions) is relaxed or turned off, if marks are interpreted as valid.

f. Detect Polarity of Region's Row. For added accuracy, the algorithm 100 utilizes Multivariate Logistic Regression to accurately detect polarity for each row. The dependent variable (outcome) of Logistic Regression is Polarity, with two possible outcomes.

For each row, regions are detected, fitted and classified assuming positive (Q-RegPos) or negative (Q-RegNeg) polarity. The Multivariate Logistic Regression model utilizes the difference between statistics of optimal positive minus optimal negative fir for a current row (Q-RegPos–Q-RegNeg) to predict correct polarity.

For any row of regions, if Logistic Regression yields ambiguous assessment of polarity for a current row, the algorithm 100 will use the same regression model applied to global Q-Reg statistics to determine and use global polarity setting.

g. Use of Row-Only Versus Global Statistics. The algorithm 100 assumes that consecutive image rows may contain varying region formats and sizes, and even opposite polarities. Therefore, mostly local Q-Reg statistics accumulated for each row are utilized in classification or 2-d region, or polarity detection.

For a large majority of fiche formats, shapes and polarity of regions are similar. In such cases, all above region detection, classification and statistically analysis equations may use global Q-Reg statistics, accumulated for all regions in all rows, rather than Q-Reg statistics for a current row only.

If such global uniformity is known ahead of analysis, the user may select a "global region format" option to take advantage of such between-rows uniformity, to use global Q-Reg statistics. This option does not assume identical column sizes or spacing, only the same polarity between rows is assumed and "similar" sizes and spacing. Otherwise the "row-only region format" allows for very diverging format and polarity between rows.

Summary

The detailed description has outlined an algorithm for automatic and robust identification of active image areas ("region finding"). This task is critical, because unattended processing of large sequences of microfiche images requires automatic detection of image areas, without operator involvement.

In short then, after regions are identified with a low-resolution prescan image, the active image regions are captured with a high-resolution line scan camera, for subsequent digitization (film-to-digital conversion). The algorithm 100 was tested with a batch containing a wide array of image formats, and is designed to identify regions in most fiche formats, except for computer-generated COM-fiche.

Figure 2:
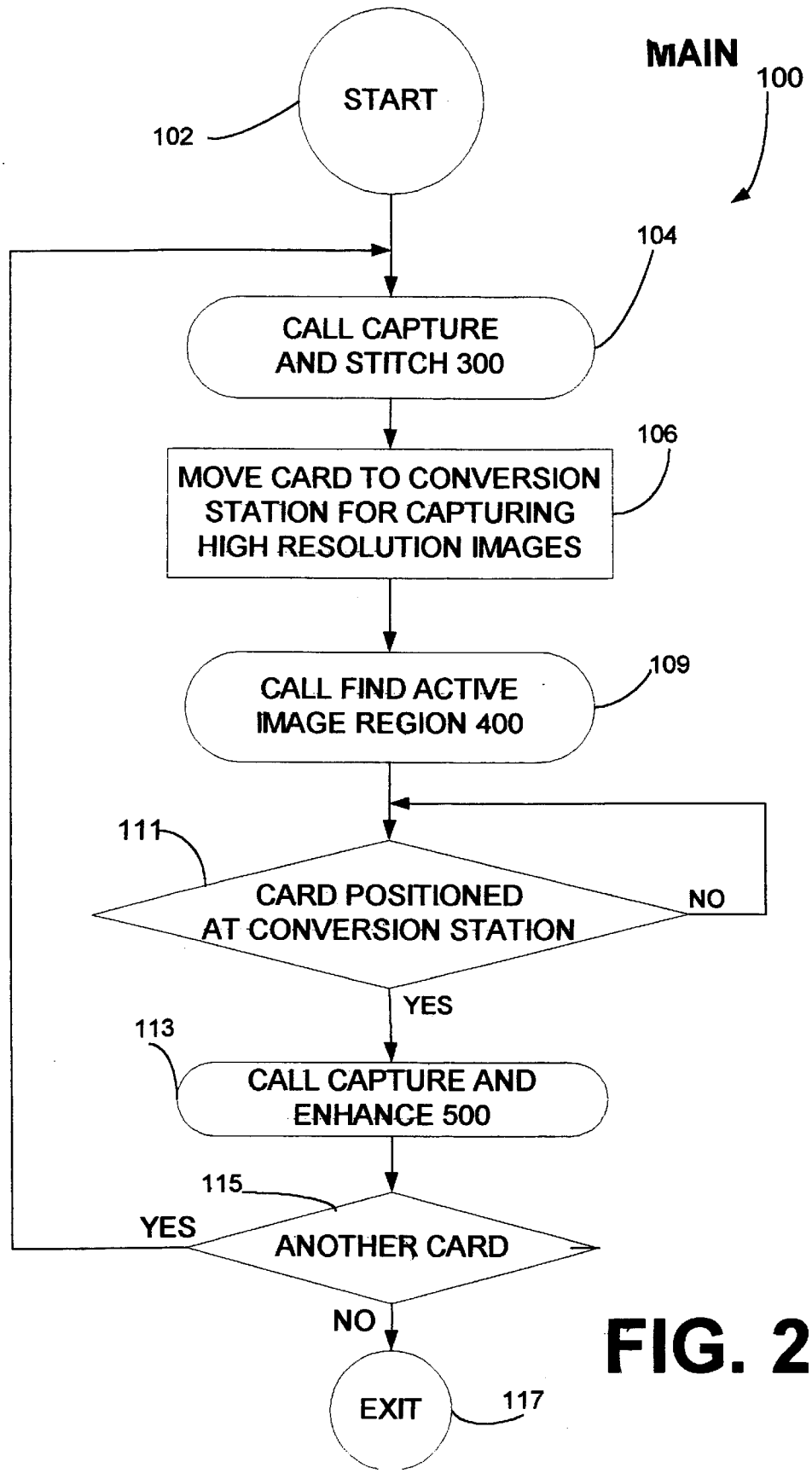
FIG. 2 is a flowchart illustrating a set of image processing steps that facilitates the identifying of active image areas on a low resolution image captured in a prescan station of FIG. 1.
Figure 3:
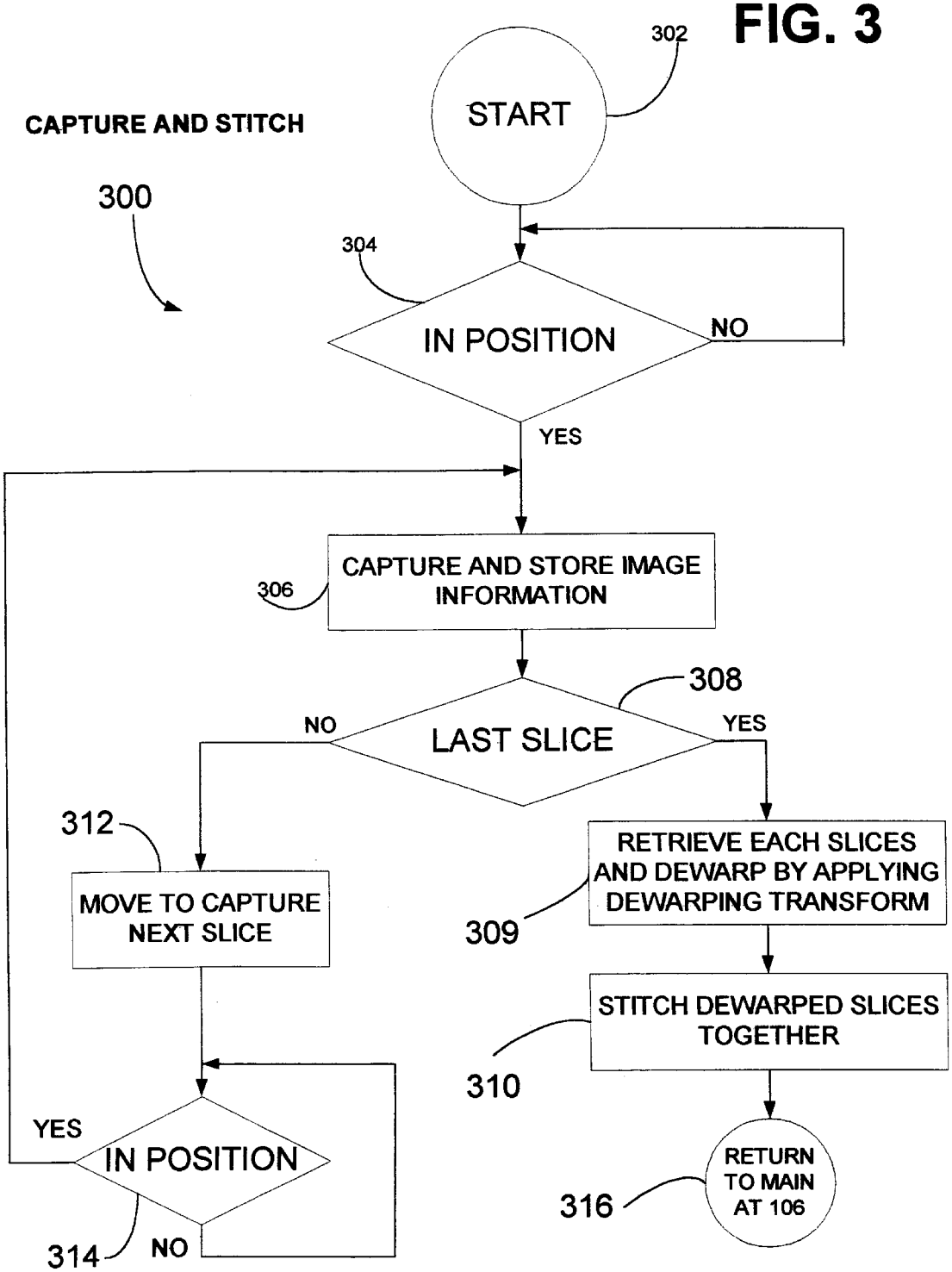
FIG. 3 is a flowchart illustrating a set of image processing steps to assemble a de-warped low resolution image of a light passing media passing through a prescan station of FIG. 1.
Figure 4:
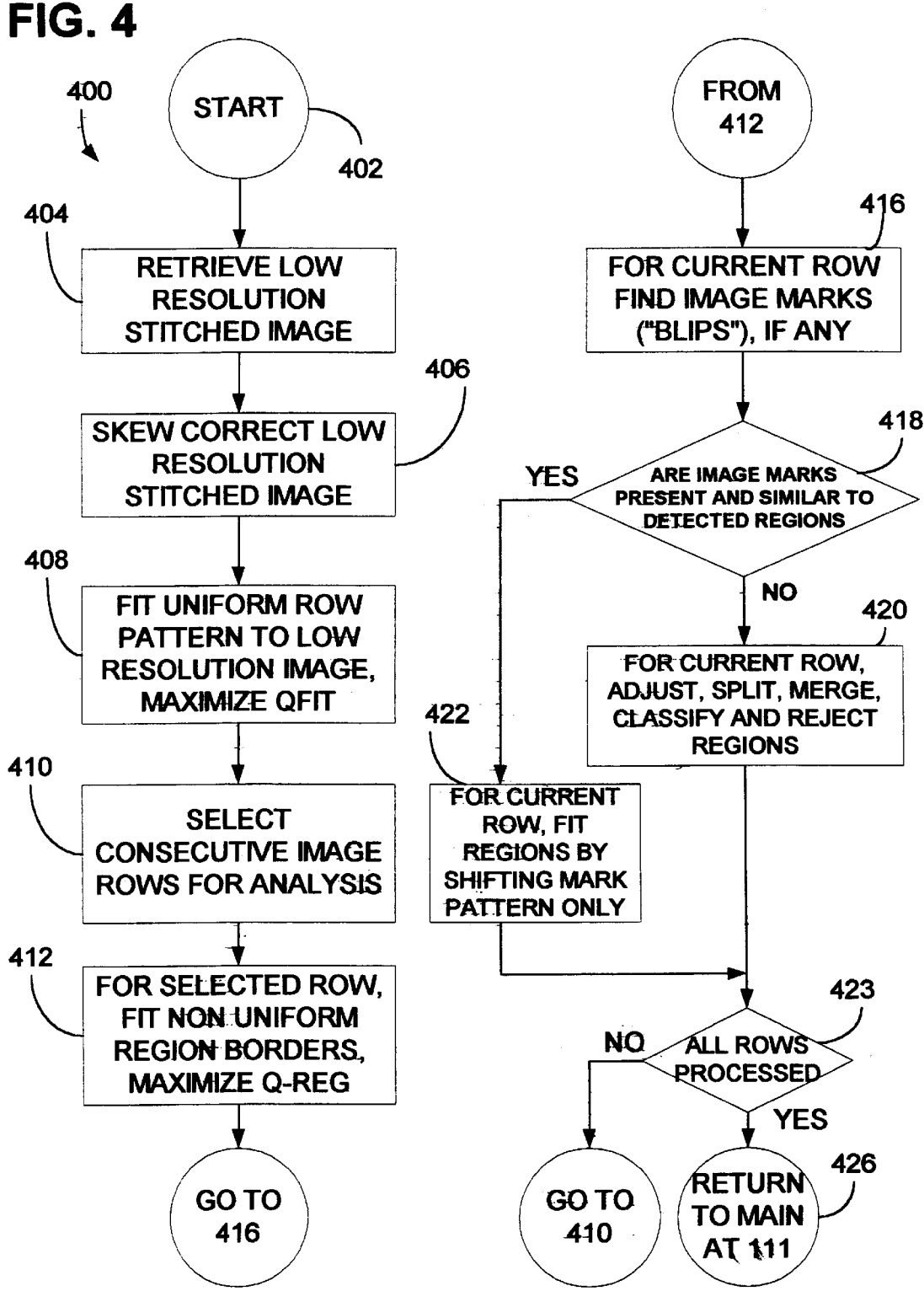
FIG. 4 is a flowchart illustrating a set of image processing steps to find the active image areas within the full low resolution image captured by a low resolution video camera forming part of the prescan station of FIG. 1.

Considering now the image region finding algorithm 100 in greater detail with reference to FIGS. 2–4, the algorithm 100 begins at a start command 102 that is initiated whenever a microfiche aperture card is detected within the prescan station 14. Upon the detection of such an aperture card, the system proceeds to a call command 104 that initiates an image capture and stitch subroutine 300 (FIG. 3) that will be described hereinafter in greater detail. It should be noted at present that the capture and stitch subroutine 300 takes the series of overlapping microfiche images and maps or stitches them into a dewarped image format indicative of a full low resolution image of the microfiche card.

Upon exiting the stitch subroutine 300, the system returns to the algorithm 100 at a move command 106 that causes the transport 13 to move the microfiche card to the conversion station 18. Next, a call command 109 calls a find active image area subroutine 400 (FIG. 4) that will be described hereinafter in greater detail. It will suffice to state however, that the find active image areas subroutine 400 substantially resolves unknown and fuzzy image formats so that active image areas and boundaries are precisely defined for the conversion station 18 processes. In short, before the microfiche card reaches the document or image conversion station 18, all image positions have been identified and all image boundary areas have been established via the low resolution image analysis performed by the find active image areas subroutine 400.

Upon exiting the subroutine 400 the system returns to algorithm 100 to a determination step 111 to determine whether the microfiche has advanced into position at the conversion station 18.

If a determination is made that the card has not advanced into position at the conversion station 18, the system waits at step 111 until the card has been positioned so as to capture the first identified active image region. Once the card has been positioned, the system proceeds to a call step 113 that calls the capture high resolution image and enhance subroutine 500 (FIG. 5) that will be described hereinafter in greater detail.

After the subroutine 500 has been executed, control is returned to the algorithm 100 by executing a determination step 115. At determination step 115 a determination is made as to whether another microfiche has been detected in the card feeder 15. If another card has not been detected, the system advances to an exit step 117. If another microfiche has been detected at the determination step 115, the system returns to the call command 104 and proceeds as previously described.

A. Capture and Stitch Algorithm

Considering now the image capture and stitch subroutine 300 in greater detail with reference to FIG. 3, the image capture and stitch subroutine 300 begins at a start command 302 each time the call command 104 (FIG. 2) is executed. The subroutine advances from the start command 302 to a position determination step 304 that verifies that a first portion of a microfiche is positioned in the prescan station 14. If the first portion of the microfiche is positioned, the subroutine proceeds to a capture and store image command 306 that causes the low resolution camera 16 to capture a first slice image of the card. If the first portion of the microfiche card is not in position for image capture purposes at determination step 304, the subroutine waits at the determination step 304 until the card has been positioned for image capture purposes in the prescan station 14.

After the first slice image of the card has been captured and stored, the subroutine advances to a determination step 308 to determine whether the captured image slice was the last slice required to form a full low resolution image of the microfiche. If the captured slice was the last slice, the subroutine advances to a retrieve and dewarp command 309. The retrieve and dewarp command 309 causes each capture slice of the current microfiche to be retrieved from storage so that the dewarping transform determined during the calibration algorithm 150 can be applied to the retrieved image. The dewarping transform corrects for any distortion in the low-resolution image caused by the lens of the video camera 16.

Once each slice of the low resolution image has been dewarped at the command step 309, the system proceeds to a stitch command 310 that causes the dewarped slices to be stitched together to form a whole low resolution image of the microfiche.

If a determination was made at step 308 that the captured slice was not the last slice, the subroutine proceeds to a move command 312 that causes the microfiche to be advanced a predetermined distance D. The predetermined distance D is a sufficient distance to permit overlapping image slices to be captured by the low resolution video camera 16.

After the move command 312 is executed, the subroutine goes to a determination step 314 to determine whether the card has been advanced the distance D. In this regard, if the card has not advanced the distance D, the subroutine loops at the determination step 314 until the card has advanced. Once the card has been advanced a distance D, the subroutine advances to the capture and store command 306 to capture another slice proceeding as described previously.

As noted earlier, the command step 310 causes the various ones of the dewarped low resolution image slices to be stitched together using a conventional image stitching algorithm. That is the position of neighboring image slices is known from reading the transport encoders. Their overlapping image regions are registered to confirm exact match between image slices. For further details about such stitching algorithms reference can be made to Brown, Lisa Gottesfeld *"Survey of Image Registration Techniques"* ACM COMPUTING SURVEYS. ACM Computing Surveys v 24, n4, December 1992. pp325–376. As such an image-stitching algorithm is conventional, the algorithm will not be described hereinafter in greater detail.

Once a full low resolution image of the microfiche has been formed for image analysis purposes, the subroutine advances to a return command 316 that returns the system to the algorithm 100 by exiting the call command 104 (FIG. 2).

B. Find Active Image Areas Algorithm

Considering now the find active image areas algorithm 400 in greater detail with reference to FIG. 4, the find active image areas algorithm 400 begins at a start command 402 when the call command 109 (FIG. 2) is executed. From the start command 402, the subroutine 400 proceeds to a retrieve command 404 that causes the low resolution stitched image to be retrieved. The algorithm then advances to a skew correction command 406 that causes a skew correction algorithm to be executed to correct the retrieved image for any skew problems. The method for correcting skew is well known to those skilled in the art and thus, the skew correction algorithm will not be discussed in any greater detail. That is, there are extensive literature references on skew detection, and method types such as: Projection Profile Analysis, Hough Transform, and FFT, among others. The present embodiment of the invention utilized the Projection algorithm, such as described by Postl or evaluated by Bagdanov (See Postl, W. "Detection of Linear Oblique Structures and Skew Scan in Digitized Documents," Eighth International Conference on Pattern Recognition— Proceedings, Paris, France; Proceedings—International Conference on Pattern Recognition 8$^{th}$. Publication by IEEE, New York, N.Y., USA. (Available from IEEE Service Cent [Cat n 86CH2342-4], Piscataway, N.J., USA pp687–689; and Bagdanov, Andrew D. et al. 'Evaluation of Document Image Skew Estimation Techniques," Document Recognition III, San Jose, Calif., USA, Proceedings of SPIE—The International Society for Optical Engineering v2660 1996. Society of Photo-Optical Instrumentation Engineers, Bellingham, Wash., USA, pp343–353.). Although Projection Profile Analysis was utilized in the preferred embodiment of the present invention, it should be recognized by those skilled in the art, that other skew correction techniques could be utilized as well. Accordingly, there is no intention of limiting the scope of the present invention to the skew correction algorithm described herein. In summary then, it should be noted that skew correction is performed to provide a set of uniform row boundaries for further image processing purposes.

Next, the algorithm proceeds to a fit command 408 that fits the optimized uniform rows patterns to a set of low resolution image boundaries determinations (n number of rows uniformly spaced from one another by a distance of $d_1$ centimeters (See earlier discussion for this process). Stated otherwise, to fit uniform row patterns, the program maximizes Q-Fit as discussed previously. In short then, the plus and minus row boundaries lines in the x direction are then stored for facilitating the movement of the high resolution camera 20 as will be explained hereinafter in greater detail.

After storing the boundary limits for each of the image rows, the program advances to a select row for analysis command 410. Rows are selected by the command 410 commencing at the row identified row and then proceeding to a next row until all of the image rows have been analyzed as will be explained hereinafter in greater detail. Once the first row or the current row has been selected for analysis the programs advances to a command step 412 that fits the non uniform column region borders using intensity and variance pattern information regarding a predetermined y column of image information as previously described. In short, command step 412 for the current selected row, fits the non uniform region borders and maximizes Q-Reg as described previously.

The program then proceeds to a find command 416 that seeks to located any image marks or "blips" that may or may not be present in the current image row. The program then advances to a determination command 418 to determine whether marks and regions are similar via the number of marks and the size of the marks detected.

At the determination step 418, if the image markers are not present and similar to the detected regions, the program advances to a command step 420 that for the current selected row, adjusts, splits, merges, classifies and rejects, regions within the column pattern as discussed previously. Alternately, at the determination step 418 if the image markers are present and similar to the detected regions, the program advances to a command step 422 that fits regions within the current row by shifting the marker pattern only. After executing either command step 420 or command step 422, the program proceed to a determination step 423 to verify that all rows within the retrieved low resolution stitched image have been processed.

If all image rows have not been processed or analyzed, the program goes to the select command step 410 to select another row for analysis and proceeds as described previously. This process is repeated iteratively until all the active image areas and borders have been identified and stored. If all rows have been analyzed, the program goes to a return command 426 that causes the program to return to the main program at step 111.

II. IMAGE ENHANCEMENT

Before discussing the image enhancement and conversion processes performed in the conversion station 18, it may be beneficial to consider first the various processes in a simplified manner involving the following steps:

1. Using the high resolution line scan camera 20 to capture each active region identified via the region finding algorithm 100 by moving the camera 20 in an orthogonal direction (the Y direction) to the microfiche which is traveling in the X direction.

2. Focusing the camera 20, using an auto-focus algorithm 1200, for the first captured image of each fiche, or the first image of the first fiche of a sequence.

3. For text processing, in a binary output mode of operation, removing background noise and other artifacts associated with speckles, scratches, and illumination artifacts, using an image enhancement algorithm 500.

4. For image processing, in a gray scale output mode of operation, enhancing and sharpening picture appearance using the image enhancement algorithm 500. Processing of image information in the gray scale output mode of operation is accomplished in a non invasive manner that does not fundamentally alter appearance of complex graphics and pictures and without distorting fine image features and graphic shapes.

5. Apply supplemental image processing methods to remove image skew and to re-scale images by non-integral magnification and reduction ratios using a skew correction algorithm and a re-scale algorithm respectively.

A. Image Enhancement Algorithm

Figure 5:
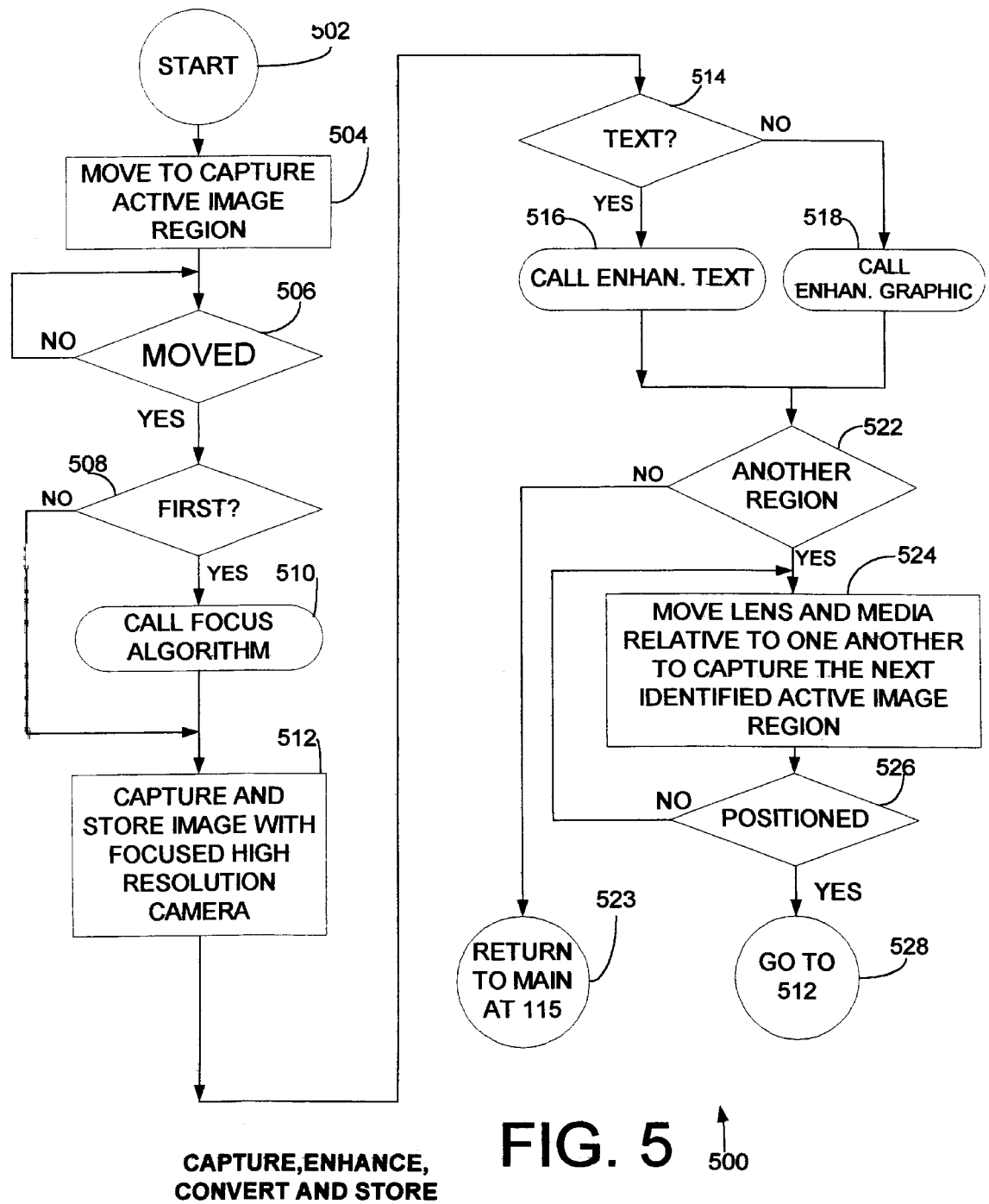
FIG. 5 is a flowchart illustrating a set of image processing steps that capture a high resolution image of an identified active image area of a light passing media positioned in a image conversion station forming part of the information system of FIG. 1.

Considering now the image enhancement algorithm 500 in greater detail with reference to FIG. 5, the image enhancement algorithm 500 enhances and improves scanned high-resolution microfilm scanned images. In this regard, as will be explained hereinafter in greater detail, the image enhancement algorithm 500 accomplishes the following functions:

1. speckle removal, which is important for binarizing text images;
2. image restoration, which is important for non-text gray scale graphic images;
3. scratch removal, such as film scratches and lines detected during the scanning process to help facilitate the restoring of original image content relative to the information obscured by such scratches and lines; and
4. background removal.

The image enhancement algorithm 500 is initiated whenever the call command 113 (FIG. 2) is executed to call the capture and enhance subroutine 500. In this regard, the image enhancement algorithm 500 begins at a start command 502 and advances to a move command 504 that controls the relative movement of the microfiche and the high resolution line camera 20 in the conversion station 18. In other words, the command causes the camera 20 to move in an orthogonal direction (a Y direction) relative to the movement of the microfiche (that travels in an X direction) to facilitate the capturing of the first active image area identified via the find active image region algorithm 400. In short then, the command 504 causes the high resolution camera 20 to be moved to an appropriate position for capturing the first image of the first fiche of a sequence as identified by the region finding algorithm 400.

After executing the move command 504, the system proceeds to a determination step 506 to verify that the microfiche and camera 20 have been positioned to capture the first identified active image region on the microfiche.

Once the card and camera 20 have been positioned, the system advances to a determination command 508 to determine whether the image to be captured image is the first image of the first fiche sequence. If the captured image is the first image of the fiche, the program proceeds to a call focus command 510 that initiates the auto-focus algorithm 1200 that will be described hereinafter in greater detail. After the call focus command 510 and the associated auto-focus subroutine 1200 have been executed, the system proceeds to a capture command 512 that causes the high-resolution camera 20 to scan the determined location area of the first fiche.

If the image is not the first image of the first fiche sequence, the system program advances directly to the capture and store command 512 that causes the high resolution camera 20 to scan the determined location area of the current fiche location. Next, a determination command 514 is executed to determine whether the sequence of microfiche being processed is primarily textual images.

If a determination is made that the sequence being processed is primarily textual images, the programs goes to a call enhance text processing command 516 that initiates a remove background noise subroutine 600 (FIG. 6) that will be described hereinafter in greater detail. If a determination is made that the sequence being processed is not primarily textual images, the program proceeds to a call enhance graphic processing command 518 that initiates a graphic process subroutine 700 that will be described hereinafter in greater detail.

After exiting the subroutine 600 or 700 as the case may be, a determination step 522 is next executed to determine whether there are any remaining identified active image regions on the microfiche. If a determination is made that there are no additional identified active image regions, the system goes to a return command 523 that returns to the main algorithm 100 at the determination step 115 where the program proceeds as described previously.

If a determination is made at step 522 that other active image regions have been identified, the program advances to a command step 524 that causes the camera 20 and the microfiche to be moved relative to one another to a position to capture the next identified active image region. The system then advances to a determination step 526 to determine whether the card and camera 20 have been properly positioned.

If the camera and card have not been positioned, the program returns to the command step 524 and proceeds as described previously. If the camera 20 and card have been positioned to capture the next active image region, the program advances from the determination step 526 to a go to command 528 that causes the program to return to the capture step 512. The program then proceeds from the determination step 514 as described previously.

From the foregoing, it should be understood by those skilled in the art that whenever a determination is made that there are no remaining active image areas to be captured and processed, the program returns to the main program 100 at the determination step 115 to determine whether another microfiche requires processing. In short then, image processing is accomplished in a fast, efficient and novel manner without the need of operator intervention except for loading and unloading of the microfiche.

B. Enhance Text Algorithm

Figure 6:
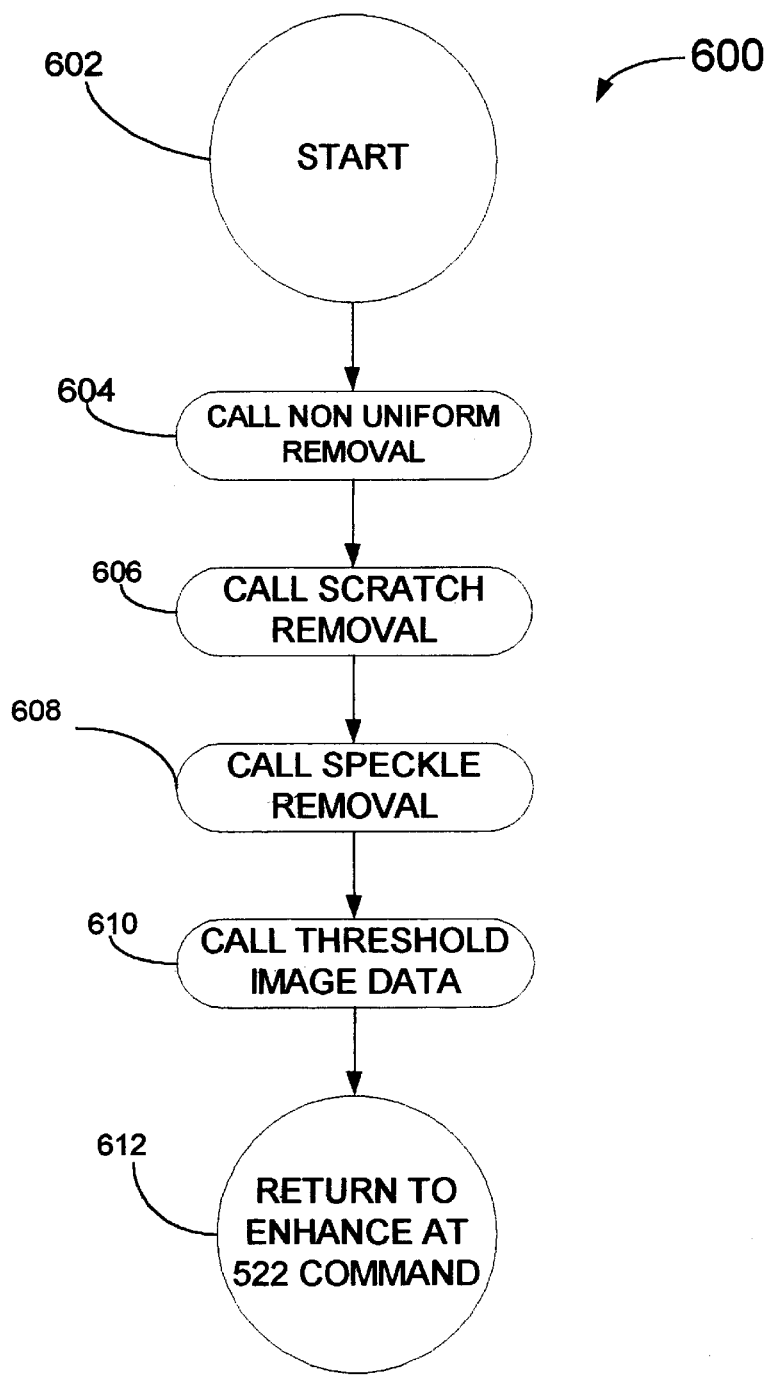
FIG. 6 is a flowchart illustrating a set of image processing steps that enhance the high-resolution image of each captured active image area.

Considering now the enhance text algorithm 600 in greater detail with reference to FIG. 6, the algorithm 600 begins at a start command 602 that is initiated by the call command 516. From the start command 602, the program proceeds to a call remove command 604 that causes a remove non-uniform background information algorithm to be executed. This type of algorithm is well known to those skilled in the art and will not be described hereinafter in greater detail. For example, Castleman describes normalization of slow-varying non-uniform background illumination. Pratt describes in more detail the Homomorphic filter utilized to remove a illumination component from unevenly illuminated images (See Castleman, K. R., "Digital Image Processing," Prentice Hall, 1996, Chapter 7.3.2p. 109 and Chapter 11; and Pratt, W. K., "Digital Image Processing, 2$^{nd}$ ed., John Wiley & Sons, 1991, p. 289).

After the remove non-uniform background information algorithm is executed, the program returns to enhancement algorithm 600 at a call scratch removal command 606. The call command 606 calls a scratch removal algorithm that enhances the text image by removing any noise indicative of image scratches. Such algorithms are well known to those skilled in the art and will not be described hereinafter in greater detail. For example, scratches extending across an entire image frame are detected and removed using a combination of two methods: the Hough Transform method and the statistical sampling method. (See Davies, E. R., "Machine Vision: Theory, Algorithms, Practicalities, "2$^{nd}$ ed., Academic Press 1997: Chapter 8 and 10; and Morris, Robin D. et al. "Sampling Based Approach to Line Scratch Removal from Motion Picture Frames," Proceedings of the 1996 IEEE International Conference on Image Processing, ICIP 1996, Part 1 (of 3); Lausanne, Switz. IEEE International Conference on Image Processing v I, 1996, IEEE, Los Alamitos, Calif., USA, 96CH35919, p.801–804].

After the scratch removal algorithm is executed, the program returns to the enhancement algorithm at a call command 608 that calls a speckle removal algorithm. It should be noted that simple image processing filters, such as low-pass, median or morphological filters are not adequate for removing speckle-type noise. These filters either distort the original image, or do not affect the speckle noise. The adaptive filters defined as a function proportional to the local information content of an image (such as local normalized variance: variance/mean) can successfully suppress speckle-type noise, without distorting the original image. In this regard, the LLLMMSE filter ("Local Linear Minimum Mean Standard Error Filter") removes speckle over homogeneous areas with speckle noise, whereas edges and high-contrast features are preserved, described by Aiazzi and Kofidis. Aiazzi describes multi-resolution pyramid application of filters layers, improves final image and assuring size-independent enhancement of noisy images. (see Aiazzi, B. et al. "Multi-resolution Adaptive Speckle Filtering: A Comparison of Algorithms," Proceedings of the 1997 IEEE International Geoscience and Remote Sensing Symposium, IGARSS '97, Part 2 (of 4), Singapore, Singapore; International Geoscience and Remove Sensing Symposium (IGARSS) v 2 1997, IEEE, Piscataway, N.J., USA, 97CH36042, p1054–1056; and Kodidis, Eleftherios et al. "Nonlinear Adaptive Filters For Speckle Suppression in Ultrasonic Images," Signal Processing, Signal Processing v 52 n3 August 1996, pp357–372.) As such speckle removing algorithms are well known to those skilled in the art, the speckle removal algorithm will not be described hereinafter in greater detail. It should suffice to state that the algorithm enhances the text image by removal of any speckle artifacts associated with the text image.

After the speckle removal algorithm is executed, the program returns to the enhancement algorithm 600 at a call command 610 that causes a threshold algorithm to be executed. This algorithm thresholds the text images to a binary black and white format. As such as threshold algorithm is well known to those skilled in the art, the algorithm will not be described hereinafter in greater detail. For example, the simple global threshold described by Ridler works well to segment text images, already normalized after background subtraction. Davies summarizes thresholding methods applied to text images. (See Ridler, "Picture Thresholding Using Iterative Selection Method," IEEE Trans. Systems Man Cybernetics, v. SMC-8, 1998, p. 630; and Davies, E. R., "Machine Vision: Theory, Algorithms, Practicalities," 2nd ed., Academic Press 1997: Chapter 4).

After the threshold algorithm is executed, the program advances to a return command 612 that returns to the enhancement subroutine 500 at the determination command 522 (FIG. 5) where the program proceeds as described previously.

C. Enhance Graphics Algorithm

Considering now the call enhance graphic algorithm or subroutine 700 in greater detail, the enhance graphics algorithm provides non-invasive sharpening of the graphic images. Non-invasive sharpening of graphic images improves appearance of the image without distorting its content. The enhance graphics algorithm 700 utilizes a conventional technique for image sharpening using (a) Unsharp Masking and a (b) Wallis Statistical Differencing as described by Pratt. (See Pratt, W. K., "Digital Image Processing," 2$^{nd}$ ed., John Wiley & Cons, 1991, chapter 10.4 pp. 304–309). Since such non-invasive sharpening processes are well known to those skilled in the art the enhance graphics algorithm 700 will not be described in greater detail.

D. Auto Focus Algorithm

Figure 12:
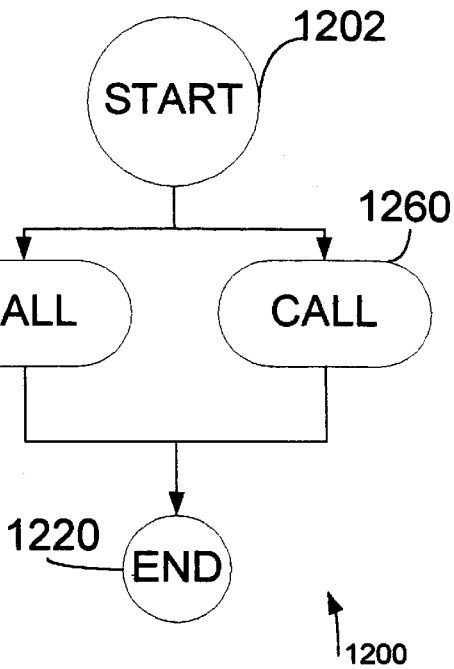
FIG. 12 is a flowchart illustrating a set of image processing steps for correcting lens distortion associated with a low-resolution video camera in FIG. 1.

Considering now the high resolution auto-focus algorithm 1200 in greater detail with reference to FIG. 12, the auto-focus algorithm 1200 causes the high resolution camera 20 to be precisely focused for image capture purposes. In a broad perspective, the high-resolution auto-focus subroutine 1200 causes the image picked up by the high-resolution camera 20 to be analyzed at varying consecutive camera focus settings, to automatically determine an optimal lens focus position. Stated otherwise, the purpose of the auto-focus image calibration is to fine-tune optimal focus of camera-lens optics in the document conversion station 18. In this regard, the high resolution auto-focus subroutine 1200 causes the camera-lens optics in the document conversion station 18 to be moved relative to a piece of microfiche to sufficiently focus the image on the microfiche for conversion purposes. After moving the camera-lens optics of the document conversion station 18 to a sufficiently focused position, the document conversion station 18 causes a series of the microfiche images to be captured in what is called an "auto-focus series" at varying focus settings around the optimal point initially determined. From the auto-focus series, the high-resolution subroutine 1200 measures focus for each captured image in the series and then identify an optimal focus camera-lens position. In summary then, the auto-focus algorithm 1200 exhibits the following properties:

a. Computationally efficiency since the algorithm is able to quickly computes the optimal settings;

b. single function peak, monotomically decreasing as image becomes out of focus; and c. robust in the presence of noise; auto-scaling response, independent of illumination and without arbitrary thresholds.

More particularly, the auto-focus algorithm 1200 (FIG. 12) employs two independent auto-focus subroutines 1210 and 1260, respectively, that function simultaneously on different orthogonal aspects of a captured image. That is, the two independent auto-focus subroutines 1210 and 1260 evaluate image focus in parallel, assuring reproducible and robust calibration. It should be noted that the auto-focus algorithm 1200 must be a) computationally efficient, that is quick to compute; b) contain single function peak, monotonically decreasing as the image becomes out of focus; c)

robust in the presence of noise; and d) auto-scaling response, independent of illumination and without arbitrary thresholds. Yeo and Krotkov describe and evaluate multiple functions to measure auto-focus, and agree to two best choices:

(a) "Variance" function performs best in the presence of noise, and smoothly decreases on both sides of the focus peak. However, the peak may be wide.

(b). "Tenegrad" function (a gradient-type function) is suitable to precisely identify the peak, after it is approximated by the "variance f" function.

Ligthart comes to a similar conclusion after evaluating similar functions, recommending "Variance" and "Square-gradient" functions. All three papers disclose detailed test results with multiple images and patterns, and effectively arrive at similar conclusions, with extensive evaluation and testing data. (See Yeo T. T. E. et al. "Auto-focusing for tissue microscopy, Image and Vision Computing v 11 n Dec. 10, 1993, pp629–639; Krotkov, "Focusing, Int. Journal computer Vision, v 1, 1997, p223; Ligthart, Guido et a. "Comparison of Different Auto-focus Algorithms," Proceedings— $6^{th}$ International Conference on Pattern Recognition. Munich, West Ger. Proceedings-Internal conference on Patent Recognition $6^{th}$ Pub. by IEEE, New York, N.Y. USA, available from IEEE Service Cent (Cat n 82CH1801-0), Piscataway, N.J., USA pp597–600). As such algorithms are well known to those skilled in the art, the auto-focus algorithm 1200 will not be described in greater detail. It should be noted however, that although such algorithms independently are well known to those skilled in the art, the idea of using such algorithms in combination is not. None of the reference discussed herein suggest nor teach the combining of such algorithms.

The information processing system 10 further includes an automatic image skew detection and inter-pixel interpolation correction algorithm. The skew correction algorithm facilitates fast skew correction that extends to correcting arbitrary rotation angles for crooked scans. In this regard, the correction algorithm functions with images at any dot-per-inch resolution, regardless of image complexity based on edges, lines or text. Such skew correction algorithms are well known and will not be described hereinafter in greater detail. For examples, see the earlier discussion on skew correction.

III. Supplemental Image Processing Tasks

A. Image Re-Scaling Algorithm

Considering now the image re-scaling and re-sampling algorithm 1100 in greater detail, the algorithm inter-pixel interpolation is applied to scaling of images by non-internal magnification and reduction ratios. In this regard, the effect is similar to application of rotation by arbitrary angle, where a non-integral pixel corresponding problem may occur. Without inter-pixel interpolation, non-uniform edges may result due to underlying pixel resolution of processed image. The interpolation algorithm intelligently uses gray-scale to rectify this problem to preserve shapes and objects from original images. See for example, Pratt. W. K. "Digital Image Processing," 2nd ed., John Wiley & Sons, 1991, chapter 14, p421.

IV. System Details

Considering now the prescan station 14 in still greater detail with reference to FIG. 1, the prescan image analysis station 14 in addition to automatically detecting of active image areas on light passing documents also facilitates the shuttling of cut film F as illustrated in FIG. 10E and aperture cards, such as the aperture card 11F (FIG. 10F) through a scan aperture SA (FIG. 1) while maintaining required card and film flatness and tracking necessary for image identification and enhancement purposes. In this regard, the media transport 13 accommodates both microfiche and aperture cards and the combination microfiche/aperture card feeder 15 that permits either cut film F or aperture cards 11F to be delivered to the media transport 13 for subsequent scanning purposes. The card feeder 15 utilizes card feeding techniques found in conventional aperture card feeders capable of accommodating different types of media such as microfiche cards, punched cards, or jacketed 16 mm film strips that simulate microfiche. An exemplary card feeder is described in copending patent application Ser. No. 09/504, 284.

It should be noted that prescan in the prescan station 14 is a function that must occur prior to scanning individual images on a microfiche in the conversion station 18. That is, through the processor 22 and the algorithm 100 described previously, image locations are precisely determined and subsequently logged, in order to facilitate high resolution scanning in a predetermined order in the conversion station 18. In this manner, only active image areas on the aperture card or microfiche are scanned, with empty spaces on the aperture card or microfiche being ignored to maximized system throughput.

The processor 22 is primary controller for all scanning operations in that the processor 22 maintains microfiche or aperture card position, responds to interface commands and formats scan data stored on a system hard drive 24 for host transmission via a transmission device, such as a modem 28, and a communication network 30. In addition, the processor 22 performs image enhancement and other image processing functions some of which are quite rigorous. In order to provide a user with easy access to the processor 22 it is contemplated that various input/output devices (not shown) such as a monitor, a keyboard and a mouse can be coupled to the processor 22 via an existing port In order to facilitate an accurate prescan operation, the prescan station 14 includes an auxiliary encoder 39 to help facilitate the determining of card or microfiche positioning in the prescan station 14. The encoder 39 is disposed in the media path P just following the feeder 15 and just before the SA. The encoder bears very lightly on the passing media since its purpose is merely to detect a leading edge portion of the media. In this regard, once the media position is established, position keeping then relies entirely upon a motor shaft encoder (not shown) coupled to a drive shaft for pinch rollers 38. Since all four sets of pinch rollers are belt-coupled to a single motor, media engagement with any set of them will meter microfiche position.

The auxiliary encoder 39 also provides a 400 pixel per inch clock for the prescan camera 16. The prescan occurs about 1.25 inches past the auxiliary encoder 39 and about 3.8 inches short of the primary scan aperture SA1. Since a microfiche is about 6 inches in length, the microfiche must pass beyond the primary scan aperture SA1 to complete the prescan operation, an then back up about 2 inches to place its leading edge back within the capture area of the prescan aperture SA1. The advantage of causing the microfiche to reverse direction is that the overall length of the transport 13 is substantially reduced. Moreover, no time is lost since the microfiche moves backward in about the same time that it takes the processor 22 to process the prescan data.

The low-resolution camera 16 captures an entire microfiche or aperture card at a resolution of about 200 pixels per inch. The scan rate of approximately 200 dpi is equivalent to a transportation rate of about 1.7 inches per second. Accordingly, at the scan rate of 200 dpi, the prescan camera 16 is able to capture the entire microfiche or aperture card in about 3.5 seconds. Processing this prescan data to find the active image areas takes between about 1 second and about 2 seconds as mentioned earlier.

In order to illuminate uniformly the media passing through the prescan station 14, the system 10 includes the electro-luminescent panel 23. The electro-luminescent panel or flat panel illuminator 23 has virtually no depth and is mounted in alignment with the low-resolution camera 16 in such a manner to uniformly illuminate a 1-inch wide by 4-inch high card. These are sufficient dimensions to permit strips of the microfiche or aperture card to be captured and stitched together electronically as has been explained herein in greater detail.

As best seen in FIG. 1, the media transport 13 holds the media in a relatively stationary position for scanning purposes. That is, unlike conventional microfiche scanners, the transport 13 includes no X–Y mechanism to move the microfiche about. Instead, horizontal or X-axis positioning of the microfiche or aperture card is accomplished by pinching and scrolling the microfiche or aperture card between a set of pinch rollers indicated generally at 38. Vertical or Y-axis positioning is unnecessary in the prescan station 14 since the camera 16 and objective lens 36 are set to a wide angle that is sufficient to capture the entire height and a substantial horizontal portion of the microfiche as previously discussed.

It should be understood by those skilled in the art that critical to this method of media transport is the ability to maintain microfiche position control very precisely and to keep the microfiche acceptably flat within the scan aperture SA. The scan aperture SA is sufficiently narrow, and the microfiche is sufficiently stiff, that edge to edge scanning is possible since the microfiche lies well within the depth of focus of the objective lens 36.

In operation, microfiche or tab cards are loaded on-edge in a media-receiving tray 40 forming part of the media feeder 15. When the prescan processor 22, under the control of a transport control algorithm (not described), initiates a feed command, a rubber-covered drive roller 44 slides a bottom one of the stacked microfiche out from the tray stack. A retard roller 46, disposed at a leading edge portion of each microfiche as the microfiche is moved from the bottom of the stack, prevents more than one microfiche from being transported from the tray 40. Stated otherwise, the retard roller 46 generates an opposing force action causing any excess microfiche pulled from the tray 40 to be moved back onto the bottom of the stack in the tray 40. The opposing drive roller 44 and retard roller 46 always rotate in a single direction causing the media to separate and exit the tray stack. Media moved from the tray 40 is then scanned using the low-resolution television camera 16.

Considering now the document conversion station 18 is greater detail with reference to FIG. 1, the document conversion station 18 includes a document conversion processor 19 and associated servo systems 24 that are coupled to the prescan image processor 22 to facilitate the focusing of the high resolution line scan camera 20. Such focusing of the line scan camera 20 is a key feature of the present invention enabling system operation with no operator manual intervention. An automatic focus algorithm 1200 evaluates a scanned image and then determines and commands an optimal focus position for a Z-axis lens carriage unit 21 forming part of the document conversion station 18.

In order to illuminate properly the light passing media with a light source that minimizes resolution loss due to scattered light, the document conversion station 18 further includes an illumination system 25. The illumination system 25 collimates and substantially uniformly illuminates the light passing media with balanced light. In this regard, the illumination system 25 includes a unique embodiment that employs a parabolic trough reflector 26, a relatively inexpensive plastic Fresnel lens 27 and a halogen lamp 29. The lamp 29 is positioned inside the focal length of the lens 27 and thus, light is gathered in much the same way as if a point filament lamp were placed at lens focus. The difference is that the filament image is out of focus everywhere, making illumination much more uniform without excessive loss of collection efficiency. The lamp 29 is also places off-axis so that the lens 27 does not focus the lamp image directly. The reflector 26 collects the light and deflects it 90 degrees toward infinity. Since the parabolic reflector 26 has power in only the horizontal axis, light is widely dispersed vertically. While this arrangement reduces efficiency, it ensures that the usable rectangular strip beam of light generated is very uniform in intensity along its entire length and width.

Considering now the lamp 29 in greater detail, the lamp 29 is a 150-watt, 120-volt halogen-filled device intended for external reflector flood-lamp applications. Unlike most small-filament projector lamps, the lamp 29 has a rated life of about 1500 hours whereas most projector lamps of the same rating have a rated life of about 50 hours. In this regard, the lamp 29 is operated at a constant intensity, stabilized by the action of a light sensor and a light control loop (not shown). The lamp 29 is operated directly off a rectified input AC power source to reduce the regulated power taken from an internal 12 volt power source (not shown). The intensity of the lamp is stabilized by controlling lamp current through a pulse width modulated series MOS-FET transistor (not shown). The modulation frequency is high enough to avoid lamp flicker an to eliminate 120 HZ ripple from the rectified power. The lamp 29 is cooled by force air from a small fan (not shown). The cooling air also lessens the heat radiating toward the lenses 27.

As best seen in FIG. 1, the media transport 13 holds the media in a relative stationary position for scanning purposes. That is, as mentioned previously the transport 13 includes no X–Y mechanism to move the microfiche or aperture card about. Instead, horizontal or X-axis positioning is accomplished by a set of closed spaced apart steel rollers indicated at 32 and 34 respectively. Vertical or Y-axis positioning is achieved by moving the high-resolution camera 20 and its associated lens, via the carriage lens unit 21, in an up and down manner relative to the microfiche or aperture card as the case may be.

Considering now the carriage lens unit 21 in greater detail with reference to FIG. 1, the carriage lens unit 21 supports for rectilinear movement in an up and down direction and in a side to side direction a plastic Fresnel lens 33. The lens 33 is about six inches in length and about one inch in width. The near side of the lens 33 is focused at a point behind the parabolic reflector 26, while its opposite side focuses at infinity. Directly behind the lens 33 is another Fresnel lens 35 that focuses at a point behind the high-resolution camera 20 when magnification of the conversion station 18 is set at a maximum magnification of about 5.3 times normal. The net effect is to illuminate the microfiche or aperture card with a nicely collimated strip of light about ¼ inches in width by about 5-inches in length with the filament image of the lamp 29 completely eliminated. In short then, the illumination is very uniform end to end over the useful vertical dimension.

Considering now the lenses 33 and 35, each of the lenses 33 and 35 is formed of molded plastic having a series of concentric annular grooves. The annular grooves approximate that of a plano-convex glass lens of much a greater thickness. In short then, the lens 33 and 35 are akin to ordinary glass lenses with spherical curvature. However, since each of the lenses 33 and 35 are only about one-inch in width, lens curvature distortion can be ignored.

Considering the illumination system 25 in still greater detail, the illumination system 25 is constructed to provide uniform light. The system 25 illuminates only a narrow strip of the microfiche or aperture card instead of an entire media area. This is made possible since scanning is accomplished by moving the media horizontally in a scrolling like manner.

Flatness of the microfiche traveling through the conversion station 18 is assured with the four closely spaced set of steel rollers 32 and 34 respectively. The rollers 32 and 34 are spaced so those rollers 32 are disposed on one side of the scan aperture SA1 with rollers 34 disposed on the opposite side of the scan aperture SA1.

Figure 13:
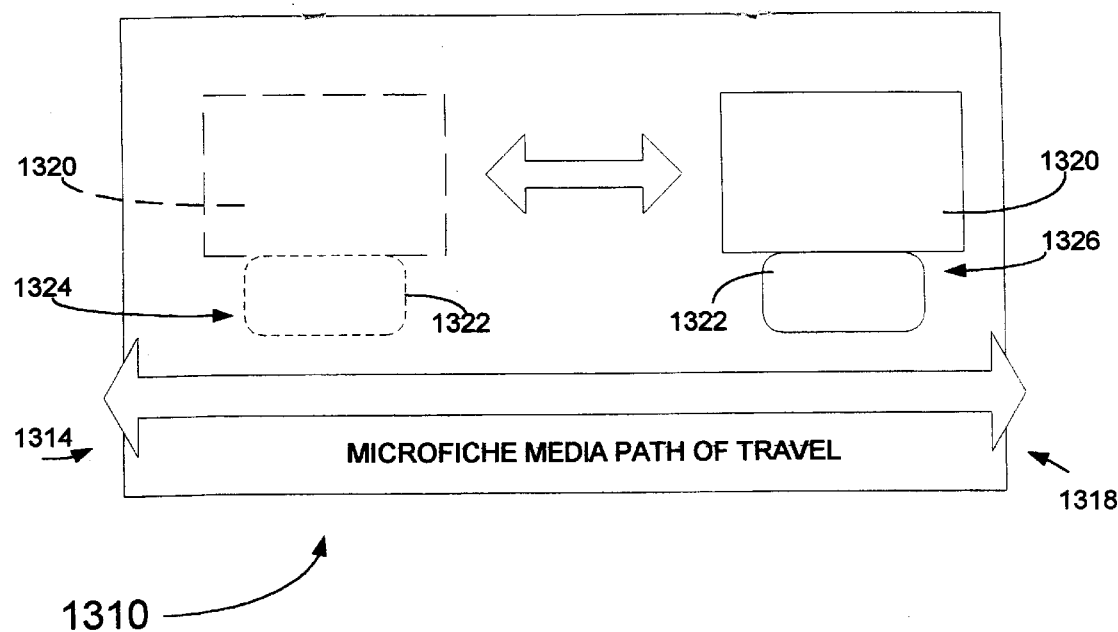
FIG. 13 is a diagrammatic illustration of an image processing system which is constructed in accordance with present invention.

Referring now to the drawings and more particularly to FIG. 13, there is illustrated an image processing system 1310 that is constructed in accordance with the present invention. The image processing system 1310 is substantially similar to image processing system 10 except the system does not include a low-resolution camera, like the low-resolution camera 16. Instead, the system 1310 includes a single high-resolution camera 1320 that is moveable by means not shown between a prescan station 1314 and a conversion station 1318. The high resolution camera 1320 has a rotatable lens 1322 for providing in a low resolution setting indicated generally at 1324 the ability to capture low resolution images, and for providing in a high resolution setting indicated generally at 1326 the ability to capture high resolution images.

In operation, the camera 1320 is first moved to the prescan station 1314 to facilitate the capture of low-resolution microfiche images which are stitched together in the same manner as described relative to the image processing system 10. Once a low resolution microfiche image is retrieved, the camera 1320 is transported to the conversion station 1328 where the camera 1320 is utilize to capture only the identified active image areas disposed on the microfiche. In this regard, the lens 1322 of the camera is set to the high resolution setting 1326 allowing the camera to capture high resolution images of the identified active image area for image conversion purposes as described previously relative to the system 10.

Figure 14:
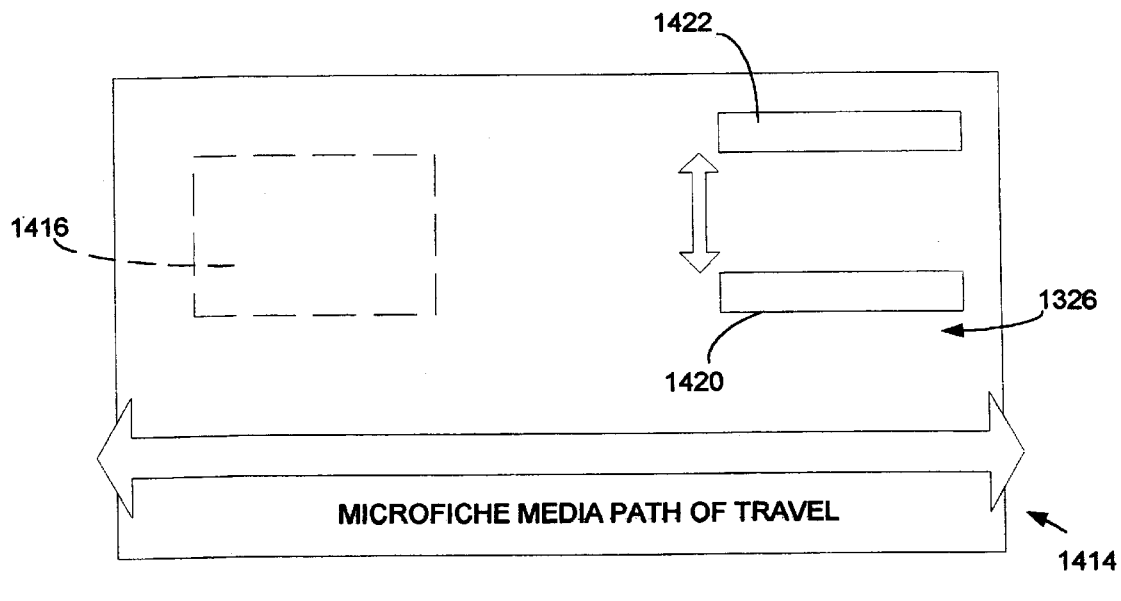
FIG. 14 is a diagrammatic illustration of another image processing system that is constructed in accordance with the present invention.

Referring now to the drawings and more particularly to FIG. 14, there is illustrated an image processing system 1410 that is constructed in accordance with the present invention. The image processing system 1410 is substantially similar to image processing system 10 except the system includes only a single image processing station 1414 having mounted therein a fixed low resolution camera 1416 and a pair of high resolution cameras, such as the camera 1420 and 1422. The high-resolution cameras 1420 and 1422 are moveable by means not show to allow the high resolution capture of small microfiche areas and large microfiche areas.

It will be appreciated by those skilled in the art that the present invention can be embodied in other specific forms without departing from the spirit or essential characteristics thereof. For example, while the embodiments above have been described with reference to a separate low resolution pre scan camera 16 and one or more high resolution cameras, such as the camera 20, it is contemplated that a single high resolution camera (in a low resolution setting, if applicable) can be utilized both for the low resolution prescan operations and the high resolution active image area scanning by moving such a camera between the prescan station and the conversion station, or alternately having a single station structure for both the prescan operations and the conversion operations. As another example, while the embodiments above have been described with reference to microfiche, jacketed fiche or aperture cards, the invention is also applicable to other types of light passing media including, for example, punched cards, cut film, cut light passing media and roll film. The presently disclosed embodiments are therefore considered in all respects to be illustrative and not restricted. In this regard, the scope of the invention is indicated by the appended claims rather than the foregoing description and all changes that come within the meaning and range and equivalence thereof are intended to be embraced therein.

We claim:

1. An unattended pre-calibrated image processing system, comprising:

low resolution scanning means for providing an image data file indicative of a microfiche card image having a plurality of discrete microfiche images arranged in at least one row;

row finding means for finding the location of said at least one row of discrete microfiche images;

quality-of-fit means responsive to said row finding means for fitting each individual one of the discrete microfiche images in said at least one row in determined height and width dimensions; and high-resolution scanning means for capturing a high-resolution image of each discrete microfiche image in said at least one row and for converting each image into another image data file.

2. An unattended image processing system according to claim 1, wherein said quality-of-fit means includes a region finding algorithm to detect non-uniform image regions within said at least one row of discrete microfiche images and to fit them within said at least row.

3. A method of processing discrete images in an unattended pre-calibrated image processing system, comprising:

determining the area location of individual ones of a plurality of discrete image areas arranged in uniform rows and non uniformly arranged columns of varying size, shape and position on an image bearing substrate; and scanning only the determined area locations of each individual one of said plurality of discrete images disposed on said image bearing substrate;

wherein said step of scanning includes:

positioning a high resolution camera at an in focus y coordinate axis position relative to said image bearing substrate;

positioning said image bearing substrate at an in focus x coordinate axis position relative to said high resolution camera;

moving said high resolution camera and said image bearing substrate relative to one another to scan a determined area location of an individual one of said plurality of discrete image areas; and repeating said steps of positioning, positioning and moving a sufficient number of times until each individual one of said plurality of discrete image areas has been scanned by said high resolution camera.

4. A method of processing discrete images according to claim 3, further comprising:

converting each scanned individual one of said plurality of discrete images into digital signals; and storing said digital signals on a storage media.

5. A method of processing discrete images according to claim 4, further comprising:

retrieving selectively individual ones of said digital signals stored on said storage media; and transferring the selected individual ones of said digital signals retrieved from said storage media to a viewing location to facilitate electronic visualization of the scanned individual one of said plurality of discrete images.

6. A method of processing discrete images according to claim 3, wherein said step of determining includes:

scanning said image bearing substrate with a low resolution camera to generate a plurality of image signals indicative of row and column patterns of light; and determining uniform row patterns of light and non uniform column patterns of light to identify the locations of the active image regions on said image bearing substrate.

7. A method of processing discrete images according to claim 6, wherein said low resolution camera is a low resolution area scanner.

8. A method of processing according to claim 3, wherein each image bearing substrate is processed automatically in a processing time of between about one second and about two seconds.

9. A method of processing discrete images according to claim 3, wherein said high resolution camera is a high resolution line scanner.

10. A method of processing discrete images according to claim 9, wherein said low resolution camera is a television camera.

11. An apparatus for processing discrete images, comprising:

means for fitting optimal row geometry with statistics to establish the location of at least one row of discrete images, wherein said at least one row of discrete images has an established row height; and means for fitting simple active image regions in their respective locations in said at least one row of discrete images, wherein each simple active image region has an assumed height and a determined width with no space between any adjacent active image region in said at least one row of discrete images.

12. An unattended pre-calibrated apparatus for processing large sequences of light passing documents in an unattended manner, comprising:

means for automatically identifying active image areas and borders of varying size, shape and position on a plurality of light passing documents transported seriatim along a prescan path;

means for generating a plurality of active image area signals indicative of the active image areas and borders of varying size, shape and position on said plurality of light passing documents;

means for responding to individual ones of said plurality of active image area signals by automatically focusing a high resolution line scanner on only the active image areas of said light passing documents traveling seriatim along said scan path; and means for converting the image information carried on the individual ones of said light passing documents captured by said line scanner into corresponding enhanced digital information signals indicative of the image information carried on the individual ones of said light passing documents.

13. A method of unattended processing of large sequences of light passing documents, comprising:

automatically identifying active image areas and borders on a plurality of light passing documents transported seriatim along a prescan path;

generating a plurality of active image area signals indicative of the active image areas and borders on said plurality of light passing documents;

responding to individual ones of said plurality of active image area signals by automatically focusing a high resolution line scanner on only the active image areas of said light passing documents traveling seriatim along said scan path; and converting the image information carried on the individual ones of said light passing documents captured by said line scanner into corresponding enhanced digital information signals indicative of the image information carried on the individual ones of said light passing documents.

14. An information processing system, comprising:

an unattended low resolution wide area pre scanning station for automatically identifying active image areas and borders on a plurality of light passing documents transported seriatim along a prescan path, said low resolution wide area pre scanning station generating a plurality of active image area signals indicative of the active image areas and borders on said plurality of light passing documents; and an unattended high resolution line scanning station having a high resolution line scanner responsive to individual ones of said plurality of active image area signals for automatically focusing said high resolution line scanner n only the active image areas of said light passing documents and for converting the image information carried on the individual ones of said light passing documents into corresponding enhanced digital information signals indicative of the image information carried on the individual ones of said light passing documents.

15. An information processing system according to claim 14, further comprising:

an unattended data transmission station for transferring the enhanced digital information signals indicative of the image information carried on individual ones of said light passing documents to a remote location for storing and viewing purposes.

16. An information processing system according to claim 15, wherein said transmission station includes information transmission means.

17. An information processing method for determining uniform active image row locations for discrete microfiche on an aperture card, comprising:

enhancing a prescan image of the aperture card by using a dilating operator when border lines are assumed bright;

maximizing a borderline variable fitted to the image enhanced with said dilating operator when border lines are assumed bright;

enhancing said prescan image of the aperture card by using another dilating operator when border lines are assumed dark;

maximizing another borderline variable fitted to the image enhanced with said another dilating operator when border lines are assumed dark; and selecting an optimal positive polarity pattern defined by said border line variable and a pre negative polarity pattern defined by said another border line variable whichever is greater, wherein a resulting paten of horizontal rows, defined by a number of rows, a starting y-coordinate of a first row, an a vertical y-height for each row to identify the uniform active image rows.

18. An information processing method according to claim 17, further comprising:

searching each determined image row for an active image region;

detecting an active image region;

classifying said active image region;

repeating said steps of searching, detecting, and classifying until all active image regions within a given determined row have been processed; and repeating said steps of searching, detecting, classifying, and repeating until all determined rows on the aperture card have been processed.

19. An unattended image processing system, comprising:

imaging means for capturing a low-resolution image of light passing media having at least one discrete image disposed thereon;

image finding means responsive to said imaging means for determining the location of said at least one discrete image on said light passing media;

quality-of-fit means responsive to said image finding means for fitting the discrete image in a determined height dimension and a determined width dimension relative to the light passing media; and wherein said imaging means is responsive to said quality-of-fit means for capturing a high-resolution image of only the determined location of said at least one discrete image and for converting the image into an image data file.

20. An unattended image processing system according to claim 19, wherein said imaging means include single scanning means.

21. An unattended image processing system according to claim 20, wherein said single scanning means is a single camera.

22. An unattended image processing system according to claim 21, wherein said single camera is a high-resolution camera.

23. An unattended image processing system according to claim 22, wherein said high resolution camera includes a low resolution setting and a high resolution setting for capturing both low resolution images and high resolution images.

24. An unattended image processing system according to claim 19, wherein said imaging means includes at least a single low-resolution camera and a single high-resolution camera.

25. An unattended image processing system according to claim 19, wherein said imaging means includes at least a single high resolution camera for capturing both high resolution and low resolution images.

26. An unattended image processing system according to claim 19, wherein said imaging means includes at least a pair of high resolution cameras for capturing both high resolution and low resolution images.

27. An unattended image processing method, comprising:

capturing a low-resolution image of a light passing media having at least one discrete image disposed thereon;

determining the location of said at least one discrete image on said light passing media;

fitting the discrete image in a determined height dimension and a determined width dimension relative to said light passing media; and capturing a high-resolution image of only the determined location of said at least one discrete image to facilitate converting the discrete image into an image data file.

* * * * *